US011284023B2

United States Patent
Yamanaka et al.

(10) Patent No.: US 11,284,023 B2
(45) Date of Patent: Mar. 22, 2022

(54) IMAGING APPARATUS, IMAGING SYSTEM, AND DRIVE METHOD OF IMAGING APPARATUS

(71) Applicant: CANON KABUSHIKI KAISHA, Tokyo (JP)

(72) Inventors: Shinji Yamanaka, Tokyo (JP); Hisashi Takado, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/902,563

(22) Filed: Jun. 16, 2020

(65) Prior Publication Data

US 2020/0314369 A1 Oct. 1, 2020

Related U.S. Application Data

(63) Continuation of application No. PCT/JP2018/046632, filed on Dec. 18, 2018.

(30) Foreign Application Priority Data

Dec. 25, 2017 (JP) .............................. JP2017-247761

(51) Int. Cl.
*H04N 5/355* (2011.01)
*H04N 5/357* (2011.01)
(Continued)

(52) U.S. Cl.
CPC ....... *H04N 5/35581* (2013.01); *H04N 5/2357* (2013.01); *H04N 5/341* (2013.01); *H04N 5/35721* (2018.08)

(58) Field of Classification Search
CPC ........... H04N 5/35581; H04N 5/35721; H04N 5/2357; H04N 5/341; H04N 5/2353; H04N 5/353; H04N 5/243
See application file for complete search history.

(56) References Cited

U.S. PATENT DOCUMENTS 7,209,169 B2    4/2007  Matsumoto
RE44,062 E  *   3/2013  Kim ...................... H04N 5/235
                                                    348/226.1
(Continued)

FOREIGN PATENT DOCUMENTS

EP    3 177 004 A2    6/2017
JP    2003-18458      1/2003
(Continued)

OTHER PUBLICATIONS

International Search Report and Written Opinion of the International Searching Authority dated Mar. 19, 2019 in International Application No. PCT/JP2018/046632 (with English translation of the International Search Report).

(Continued)

*Primary Examiner* — Chiawei Chen

(74) *Attorney, Agent, or Firm* — Venable LLP

(57) ABSTRACT

In an imaging apparatus as an embodiment, a drive unit drives pixels so that a photoelectric conversion unit alternately performs accumulation of charges in a first exposure period and accumulation of charges in a second exposure period having different length from the first exposure period. A control unit performs a first exposure in a first cycle and performs a second exposure in second cycle when a result of detection indicates that a subject is not blinking. Further, the control unit performs a first exposure in a cycle different from the first cycle when the result of detection indicates that the subject is blinking.

15 Claims, 19 Drawing Sheets

(51) Int. Cl.
*H04N 5/235* (2006.01)
*H04N 5/341* (2011.01)

(56) References Cited

U.S. PATENT DOCUMENTS

| | | | |
|---|---|---|---|
| 9,900,532 B2 | 2/2018 | Takado | |
| 9,900,535 B2 | 2/2018 | Takado | |
| 9,912,886 B2 | 3/2018 | Shigeta | |
| 9,936,152 B2 | 4/2018 | Shida | |
| 10,044,992 B2 | 8/2018 | Takado | |
| 10,122,951 B2 | 11/2018 | Takado | |
| 10,244,192 B2 | 3/2019 | Shigeta | |
| 10,455,177 B2 | 10/2019 | Tsuboi | |
| 10,477,165 B2 | 11/2019 | Takado | |
| 10,541,259 B2 | 1/2020 | Nakamura | |
| 10,645,325 B2 | 5/2020 | Takado | |
| 2007/0247536 A1* | 10/2007 | Murakami | H04N 5/35581 348/302 |
| 2008/0231737 A1* | 9/2008 | Weale | H04N 5/335 348/308 |
| 2011/0298956 A1* | 12/2011 | Giffard | H04N 3/155 348/308 |
| 2013/0242087 A1* | 9/2013 | Kanemitsu | G03B 13/36 348/135 |
| 2014/0153839 A1 | 6/2014 | Tsuzuki | |
| 2015/0312464 A1* | 10/2015 | Peng | H04N 5/3532 348/226.1 |
| 2016/0006919 A1* | 1/2016 | Aoyama | G01J 1/28 348/226.1 |
| 2016/0073001 A1* | 3/2016 | Nakagawara | H04N 5/2357 348/226.1 |
| 2016/0182839 A1* | 6/2016 | Shigeta | H04N 5/35581 348/362 |
| 2016/0198110 A1* | 7/2016 | Ikedo | H04N 13/218 348/231.99 |
| 2016/0330414 A1 | 11/2016 | Takado | |
| 2017/0013183 A1* | 1/2017 | Masuno | H04N 5/2357 |
| 2017/0026594 A1* | 1/2017 | Shida | H04N 5/35581 |
| 2017/0163921 A1* | 6/2017 | Tsuboi | H04N 5/37452 |
| 2017/0256067 A1* | 9/2017 | Yamada | H04N 5/2353 |
| 2017/0347047 A1* | 11/2017 | Mao | H04N 5/23229 |
| 2017/0353678 A1* | 12/2017 | Ogushi | H04N 5/35581 |
| 2018/0020172 A1* | 1/2018 | Hirota | H04N 5/37452 |
| 2018/0324344 A1* | 11/2018 | Kinoshita | H04N 5/2355 |
| 2019/0199978 A1 | 6/2019 | Takado | |
| 2019/0335079 A1* | 10/2019 | Koizumi | H04N 5/35572 |
| 2020/0112666 A1* | 4/2020 | Fujimoto | G06K 9/4604 |
| 2020/0137286 A1 | 4/2020 | Takado | |
| 2020/0228741 A1 | 7/2020 | Takado | |
| 2020/0252570 A1 | 8/2020 | Sekine | |
| 2020/0314369 A1* | 10/2020 | Yamanaka | H04N 5/35721 |

FOREIGN PATENT DOCUMENTS

| | | |
|---|---|---|
| JP | 2015-92660 | 5/2015 |
| JP | 2016-119652 | 6/2016 |
| JP | 2016-146592 | 8/2016 |
| JP | 2017-28490 | 2/2017 |
| JP | 2017-103727 | 6/2017 |
| JP | 2017-161512 | 9/2017 |
| WO | 2017/077775 A1 | 5/2017 |

OTHER PUBLICATIONS

International Preliminary Report on Patentability dated Jun. 30, 2020 in International Application No. PCT/JP2018/046632.
European Search Report issued in corresponding application No. 18897584.1 dated Jul. 20, 2021.
Japanese Office Action dated Feb. 3, 2022 during prosecution of related Japanese application No. 2017-247761 (with machine translation).

* cited by examiner

IMAGING APPARATUS, IMAGING SYSTEM, AND DRIVE METHOD OF IMAGING APPARATUS

CROSS-REFERENCE TO RELATED APPLICATIONS

This application is a Continuation of International Patent Application No. PCT/JP2018/046632, filed Dec. 18, 2018, which claims the benefit of Japanese Patent Application No. 2017-247761, filed Dec. 25, 2017, both of which are hereby incorporated by reference herein in their entirety.

BACKGROUND OF THE INVENTION

Field of the Invention

The present invention relates to an imaging apparatus, an imaging system, and a drive method of the imaging apparatus.

Description of the Related Art

In recent years, in imaging apparatuses, technologies to suppress flicker due to a light source such as a fluorescent light, a light emitting diode (LED), or the like have been proposed. Japanese Patent Application Laid-Open No. 2003-18458 discloses an imaging apparatus that suppresses flicker in accordance with a blinking cycle of a light source.

SUMMARY OF THE INVENTION

In high dynamic range capturing or the like, it is necessary to read out two types of images captured by different lengths of exposure periods. However, the imaging apparatus disclosed in Japanese Patent Application Laid-Open No. 2003-18458 merely suppresses flicker in images obtained with the same length of exposure periods and is unable to suppress flicker in a plurality of images obtained with different lengths of exposure periods.

The present invention has been made in view of the above problem and intends to suppress flicker in a plurality of images obtained with different lengths of exposure periods.

An imaging apparatus in one embodiment of the present invention includes: a plurality of pixels each including a photoelectric conversion unit that accumulates charges in accordance with incident light from a subject; a drive unit that drives the pixels so that the photoelectric conversion unit performs accumulation of charges in each of a first exposure with a first exposure period and a second exposure with a second exposure period that is longer than the first exposure period; a detection unit that performs detection of blinking of the subject; and a control unit, the control unit performs the first exposure in a first cycle and performs the second exposure in a second cycle when a result of the detection indicates that the subject is not blinking, and the control unit performs the first exposure in a cycle that is different from the first cycle when the result of the detection indicates that the subject is blinking.

A drive method of an imaging apparatus in another embodiment of the present invention is a drive method of an imaging apparatus including a plurality of pixels each including a photoelectric conversion unit that accumulates charges in accordance with incident light from a subject, and the drive method includes: driving the pixels so that the photoelectric conversion unit alternately performs accumulation of charges in a first exposure period and accumulation of charges in a second exposure period having a different length from the first exposure period; and changing a start timing of either the first exposure period or the second exposure period in accordance with comparison between a first pixel signal based on charges accumulated in the first exposure period and a second pixel signal based on charges accumulated in the second exposure period.

Further features of the present invention will become apparent from the following description of exemplary embodiments with reference to the attached drawings.

DESCRIPTION OF THE EMBODIMENTS

Embodiments of the present invention will be described below. In imaging apparatuses in first to fourth embodiments, each of a plurality of pixels has a photoelectric conversion unit that accumulates charges in accordance with incident light from a subject. A drive unit drives the pixel so that the photoelectric conversion unit alternately performs accumulation of charges in a first exposure period and accumulation of charges in a second exposure period having a different length from the first exposure period. A detection unit detects blinking of a subject in accordance with a first pixel signal based on the charges accumulated in the first exposure period and a second pixel signal based on the charges accumulated in the second exposure period. A control unit performs the first exposure in a first cycle and performs the second exposure in a second cycle when a result of the detection indicates that the subject is not blinking. Further, the control unit performs the first exposure in a cycle different from the first cycle when a result of the detection indicates that the subject is blinking. Furthermore, the control unit may change a start timing of either the first exposure period or the second exposure period when the detection unit detects blinking of the subject.

According to the present embodiment, by changing the start timing of either the first exposure period or the second exposure period, it is possible to avoid unevenness of incident light in each of the first exposure period or the second exposure period. Accordingly, it is possible to avoid flicker in the first pixel signal based on the first exposure period or the second pixel signal based on the second exposure period. Specifically, it is possible to suppress flicker in a plurality of images obtained with different lengths of exposure periods.

The embodiments of the present invention will be described below with reference to the drawings. The present invention is not limited to the embodiments described below. For example, a configuration of a part of any of the embodiments below may be added to another embodiment or replaced with a configuration of a part of another embodiment.

First Embodiment

Figure 1:
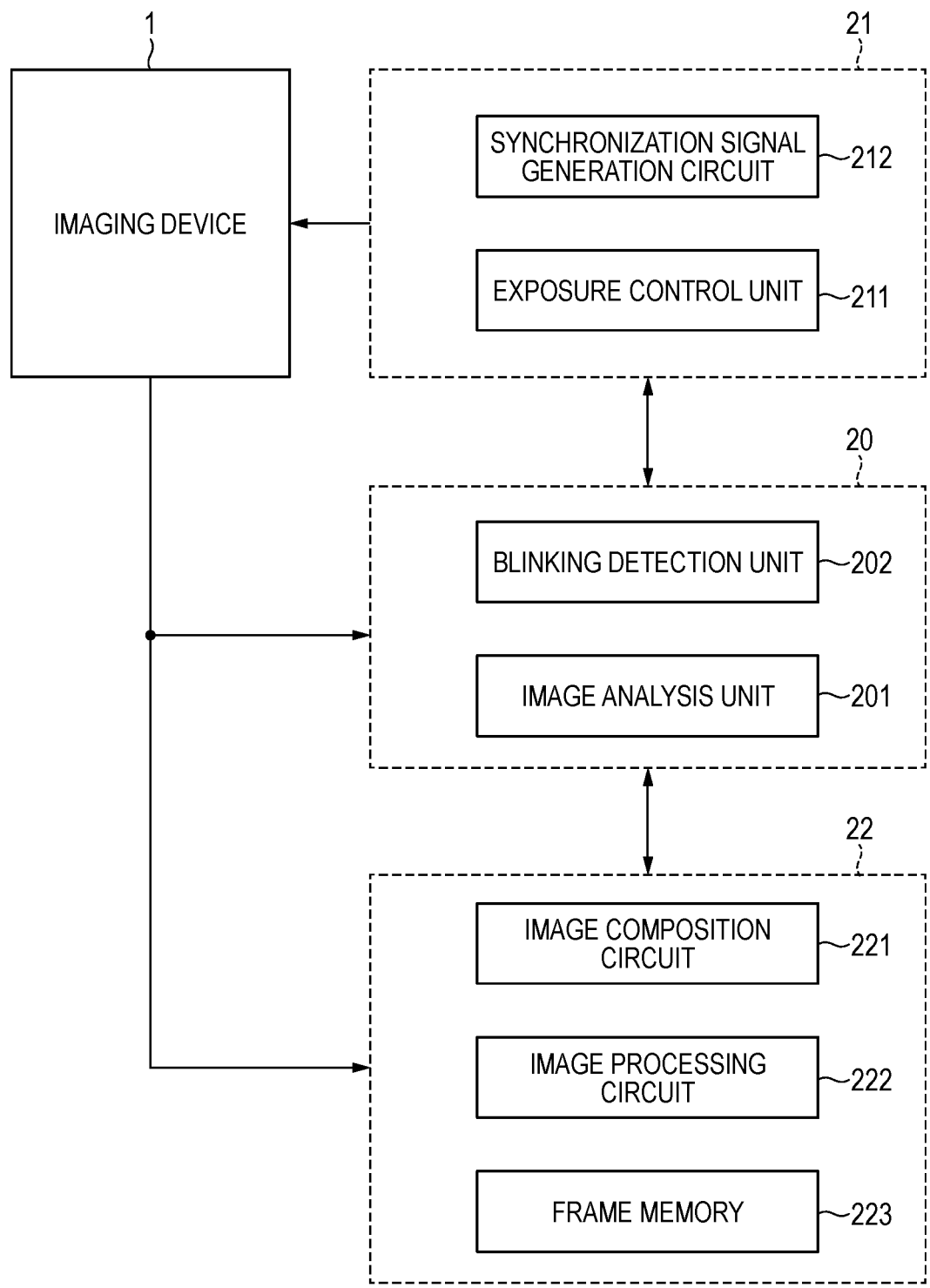
FIG. 1 is a block diagram of an imaging apparatus in a first embodiment.

FIG. 1 is a block diagram of an imaging apparatus in the present embodiment. The imaging apparatus has an imaging device 1, a detection unit 20, a control unit 21, and a signal processing unit 22. The imaging device 1 is a solid state imaging device such as a Complementary Metal Oxide Semiconductor (CMOS) image sensor, for example. A subject image from an optical system (not illustrated) is captured on the imaging device 1, and an image signal in accordance with the subject image is output.

The detection unit 20 has an image analysis unit 201 and a blinking detection unit 202. The image analysis unit 201 detects a subject in two image signals obtained with different exposure periods. For example, the image analysis unit 201 compares a long-time image signal with a short-time image signal and detects a subject located at the same position (coordinates). The blinking detection unit 202 detects flicker of a subject detected by the image analysis unit 201.

The control unit 21 has an exposure control unit 211 and a synchronization signal generation circuit 212. The exposure control unit 211 determines a length of an exposure period and a start timing of an exposure in accordance with a detection result from the blinking detection unit 202. The synchronization signal generation circuit 212 has a clock circuit and a gate circuit and generates a vertical synchronization signal and a horizontal synchronization signal.

The signal processing unit 22 is formed of a digital circuit such as a digital signal processor (DSP) and has an image composition circuit (image composition unit) 221, an image processing circuit 222, and a frame memory 223. The image composition circuit 221 composes two images resulted from different lengths of exposure periods and generates a high dynamic range (HDR) image. The image processing circuit 222 performs processing such as color carrier removal, noise removal, aperture correction, gamma correction, color interpolation, data compression, or the like on an image signal output from the imaging device 1 and outputs the processed image signal as a moving image bit-stream. The frame memory 223 can hold multiple frames of images and may hold two images resulted from different lengths of exposure periods. Further, the signal processing unit 22 performs various processing on an image held in the frame memory 223. Note that the signal processing unit 22 is not necessarily required to be included in the imaging apparatus and may be provided in an apparatus separate from the imaging apparatus.

Figure 2:
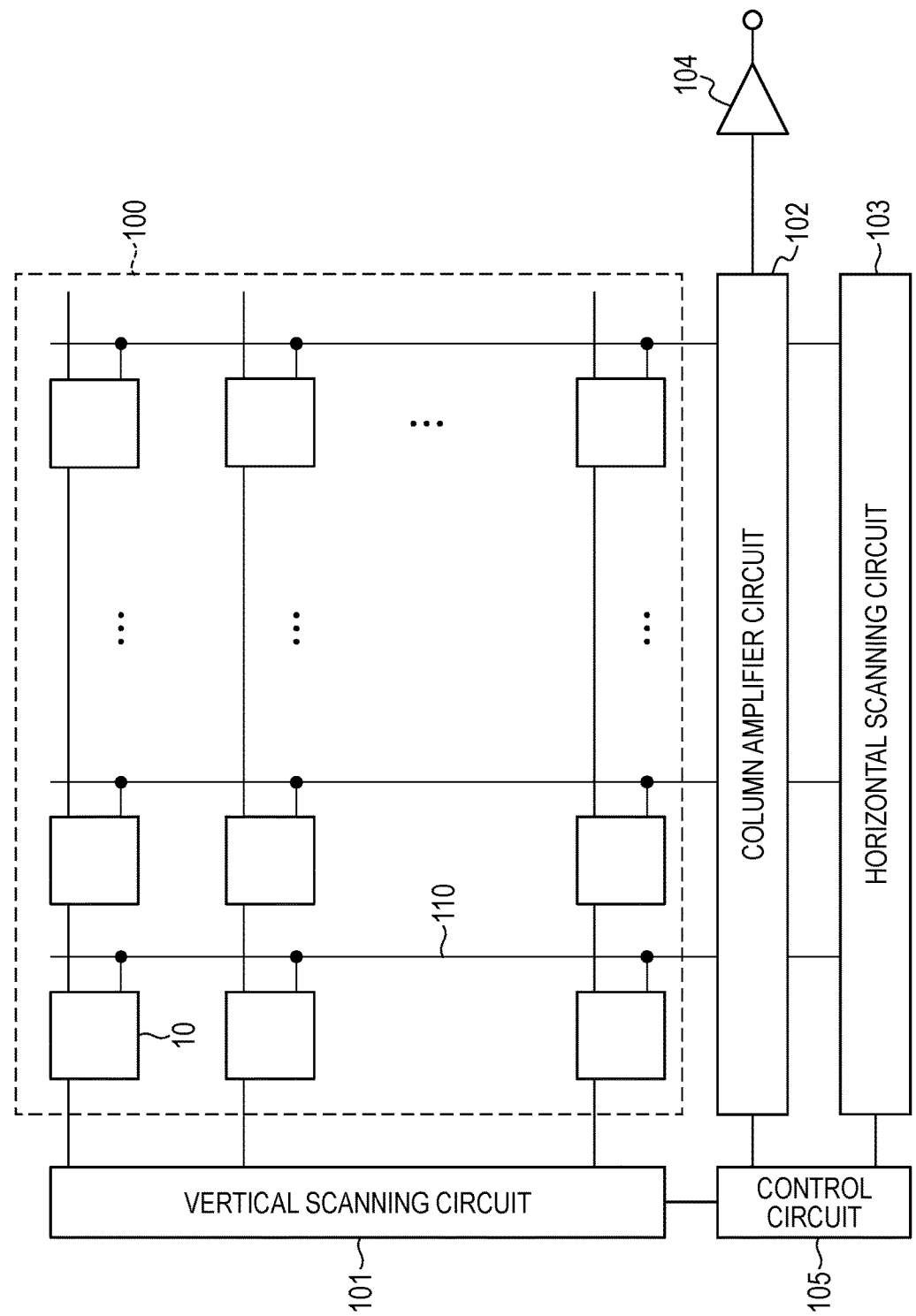
FIG. 2 is a block diagram of an imaging device in the first embodiment.

FIG. 2 is a block diagram of the imaging device in the present embodiment. The imaging device 1 has a pixel unit 100, a vertical scanning circuit (drive unit) 101, a column amplifier circuit 102, a horizontal scanning circuit 103, an output circuit 104, and a control circuit 105. The pixel unit 100 has a plurality of pixels 10 arranged in an XY matrix. Note that, in the present specification, a row direction refers to the horizontal direction in the drawings, and a column direction refers to the vertical direction in the drawings. Micro-lenses and color filters may be arranged on the pixels 10. The color filters are primary-color filters of red, blue, and green, for example, and provided on respective pixels 10 in accordance with the Bayer arrangement. Some of the pixels 10 are shielded from light as optical black (OB) pixels. In the plurality of pixels 10, ranging rows on which focus detection pixels that output pixel signals used for focus detection are arranged and a plurality of imaging rows on which imaging pixels that output pixel signals used for generating an image are arranged may be provided.

The vertical scanning circuit 101 is formed of a shift register, a gate circuit, a buffer circuit, or the like, outputs control signals to the pixels 10 based on a vertical synchronization signal, a horizontal synchronization signal, a clock signal, and the like, and drives the pixels 10 on a row basis. The column signal lines 110 are provided for each column of the pixels 10, and the pixels 10 on the same column output pixel signals to the common column signal line 110. The column amplifier circuit 102 amplifies a pixel signal output to the column signal line 110 and performs a correlated double sampling process based on a signal at the time of reset of the pixel 10 and a signal at the time of photoelectric conversion. The horizontal scanning circuit 103 supplies control signals used for controlling switches to be switched on or off to these switches connected to the amplifiers of the column amplifier circuit 102. The output circuit 104 is formed of a buffer amplifier, a differential amplifier, or the like and outputs a pixel signal from the column amplifier circuit 102 to a signal processing unit outside the imaging apparatus. Note that an AD conversion unit may be provided to the imaging device to output a digital image signal. The control circuit 105 generates various control signals and drive signals based on a clock signal, a synchronization signal, or the like and controls the vertical scanning circuit 101, the column amplifier circuit 102, and the horizontal scanning circuit 103.

Figure 3:
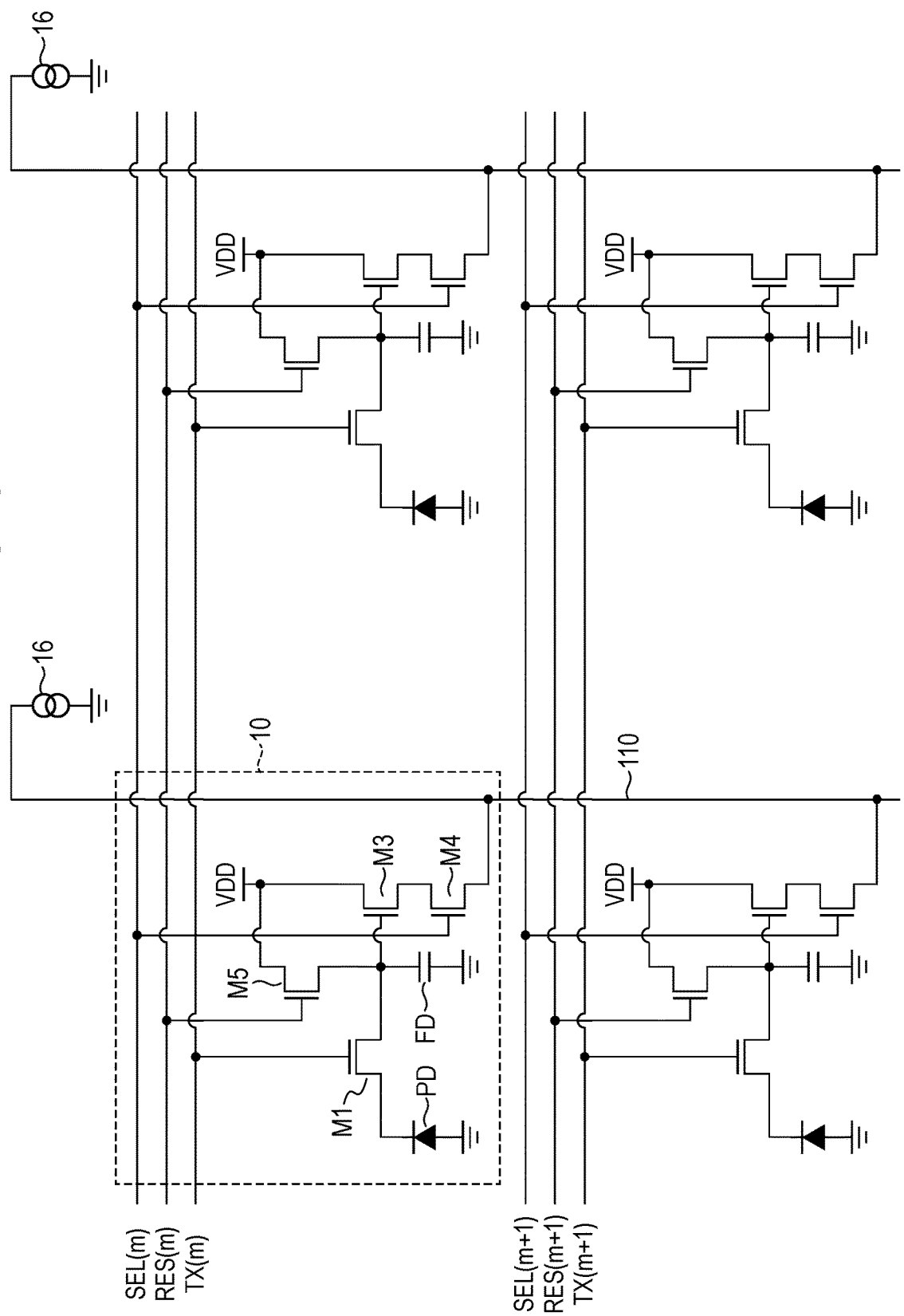
FIG. 3 is a diagram illustrating an equivalent circuit of images in the first embodiment.

FIG. 3 illustrates an equivalent circuit of the pixel 10 in the present embodiment. Although FIG. 3 illustrates four pixels 10 of two rows×two columns of the plurality of pixels 10 arranged two-dimensionally in the row direction and the column direction, the imaging apparatus has more pixels. Each pixel 10 has a photoelectric conversion unit PD, a floating diffusion portion FD, a transfer transistor M1, an amplifier transistor M3, a select transistor M4, and a reset transistor M5.

The photoelectric conversion unit PD photoelectrically converts incident light and accumulates charges caused by photoelectric conversion. When switched on, the transfer transistor M1 transfers charges of the photoelectric conversion unit PD to the floating diffusion portion FD. A power source voltage VDD is applied to the drain of the amplifier transistor M3, and the source is connected to the column signal line 110 via the select transistor M4. The amplifier transistor M3 forms a source follower and outputs a signal based on a voltage of the floating diffusion portion FD to the column signal line 110 via the select transistor M4. A constant current source 16 is connected to the column signal line 110. The power source voltage VDD is applied to the drain of the reset transistor M5, and when switched on, the reset transistor M5 resets the voltage of the floating diffusion portion FD.

Common control signals are supplied from the vertical scanning circuit 101 to the pixels 10 on the same row. That is, control signals TX(m), SEL(m), and RES(m) are supplied to the transfer transistor M1, the select transistor M4, and the reset transistor M5 of the pixels 10 on the m-th row, respectively. These transistors are each switched on when the control signal is at a high level and are each switched off when the control signal is at a low level. By controlling the control signals on each row to be switched on or off at the same time, it is possible to perform control of exposure periods in a plurality of pixels 10 at the same time. Note that a plurality of pixels 10 may share one amplifier transistor M3.

Figure 4:
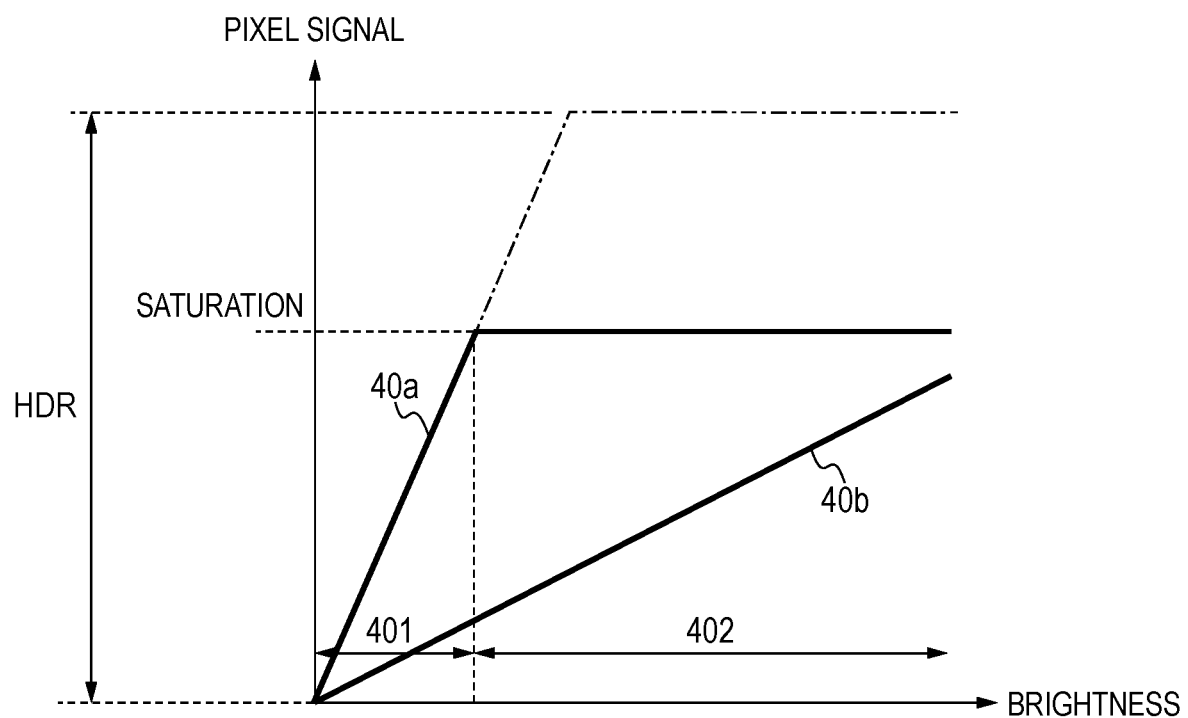
FIG. 4 is a diagram illustrating image composition with a high dynamic range in the first embodiment.

FIG. 4 is a diagram illustrating image composition with a high dynamic range. The horizontal axis represents brightness of a subject entering the pixel 10, and the vertical axis represents the level of a pixel signal output form the pixel 10. Characteristics of a pixel signal 40a and pixel signal 40b with respect to the level of a pixel signal to the incident light intensity are illustrated. The pixel signal 40a is generated based on charges for a longer charge accumulation time compared to the pixel signal 40b. In the following description, the charge accumulation time of the pixel signal 40a (first exposure period) is referred to as a long-time exposure or a long-time exposure period, and the charge accumulation time of the pixel signal 40b (second exposure period) is referred to as a short-time exposure or a short-time exposure period. The long-time exposure may be, for example, 200 times the length of the short-time exposure and may be changed as appropriate in accordance with an imaging apparatus.

When the subject is dark, neither the pixel signal 40a nor the pixel signal 40b is saturated (region 401). In such a case, with a use of the pixel signal 40a, an image of a high signal-to-noise ratio can be obtained. When the subject is bright, the pixel signal 40b is not saturated, but the pixel signal 40a of a long-time exposure is saturated (region 402). The image composition circuit 221 amplifies the pixel signal 40b in the region 402 by using digital signal processing and replaces the saturated pixel signal 40a with the amplified pixel signal 40b. Thereby, a high dynamic range image exceeding the saturation level of the pixel signal 40a can be generated.

Figure 5:
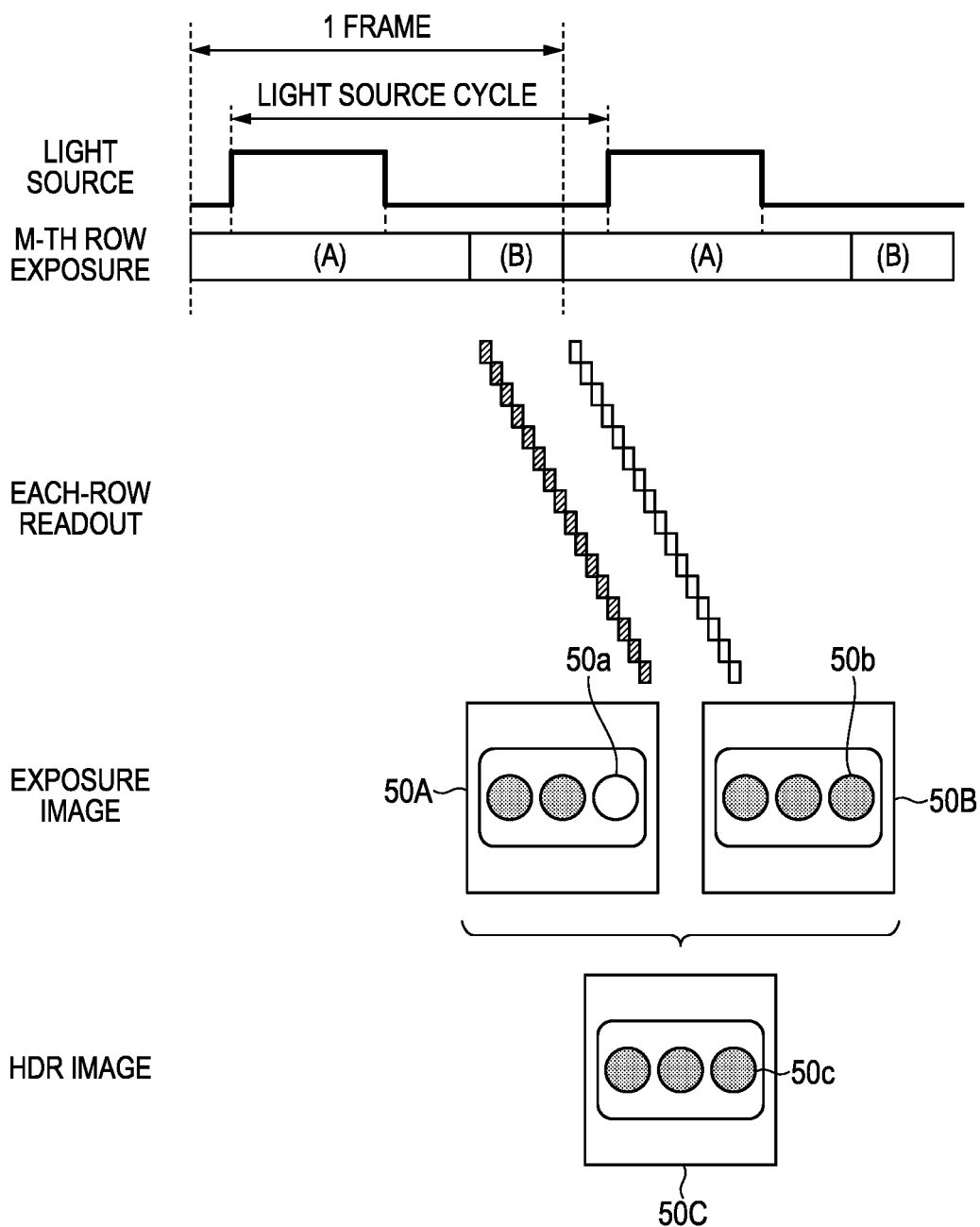
FIG. 5 is a diagram illustrating a problem in capturing a high dynamic range image.

FIG. 5 is a diagram illustrating a problem when a high dynamic range image is captured and illustrates operations of exposure and readout when a light source is captured and an image read out accordingly. In this case, it is assumed that the light source is a traffic light using LED lamps and the right LED lamp of three LED lamps is in a turned-on state. An LED appears to be in the turned-on state for human eyes due to a residual image but is blinking at several hundred Hz.

After reset operations of the pixels 10 are performed, the pixels 10 start a long-time exposure (A). Since a turned-on period of the light source is included in the long-time exposure (A), charges in accordance with incident light are accumulated in the pixels 10. When the light source is extremely bright, charges in the pixels 10 are saturated. Pixel signals in the long-time exposure (A) are read out from the pixels 10, and the pixels 10 start a short-time exposure (B). Since only the turned-off period of the light source is included in the short-time exposure (B), charges accumulated in the pixels 10 decrease. Pixel signals in the short-time exposure (B) are then read out from the pixels 10. Note that, although only the exposure timing on the m-th row is depicted in FIG. 5, exposures on each row are driven with a shift by a predetermined time, and pixel signals are read out sequentially on a row basis. In such a way, a long-time exposure image 50A and a short-time exposure image 50B are read out, respectively.

In the long-time exposure image 50A and the short-time exposure image 50B, black one represents a turned-off state, and white one represents a turned-on state. In the long-time exposure image 50A, while a turned on light source is included as a subject 50a, a signal of the subject 50a is saturated, and color information is lost. On the other hand, in the short-time exposure image 50B, a subject 50b of the light source is in the turned-off state. In a high dynamic range image 50C, the saturated subject 50a of the long-time exposure image 50A is replaced with the subject 50b of the short-time exposure image 50B. Since the subject 50b is in the turned-off state, however, the subject 50c in the high dynamic range image 50C is also in the turned-off state, and it is no longer possible to suppress flicker. A drive method of the imaging apparatus for solving the problem described above will be described below.

Figure 6:
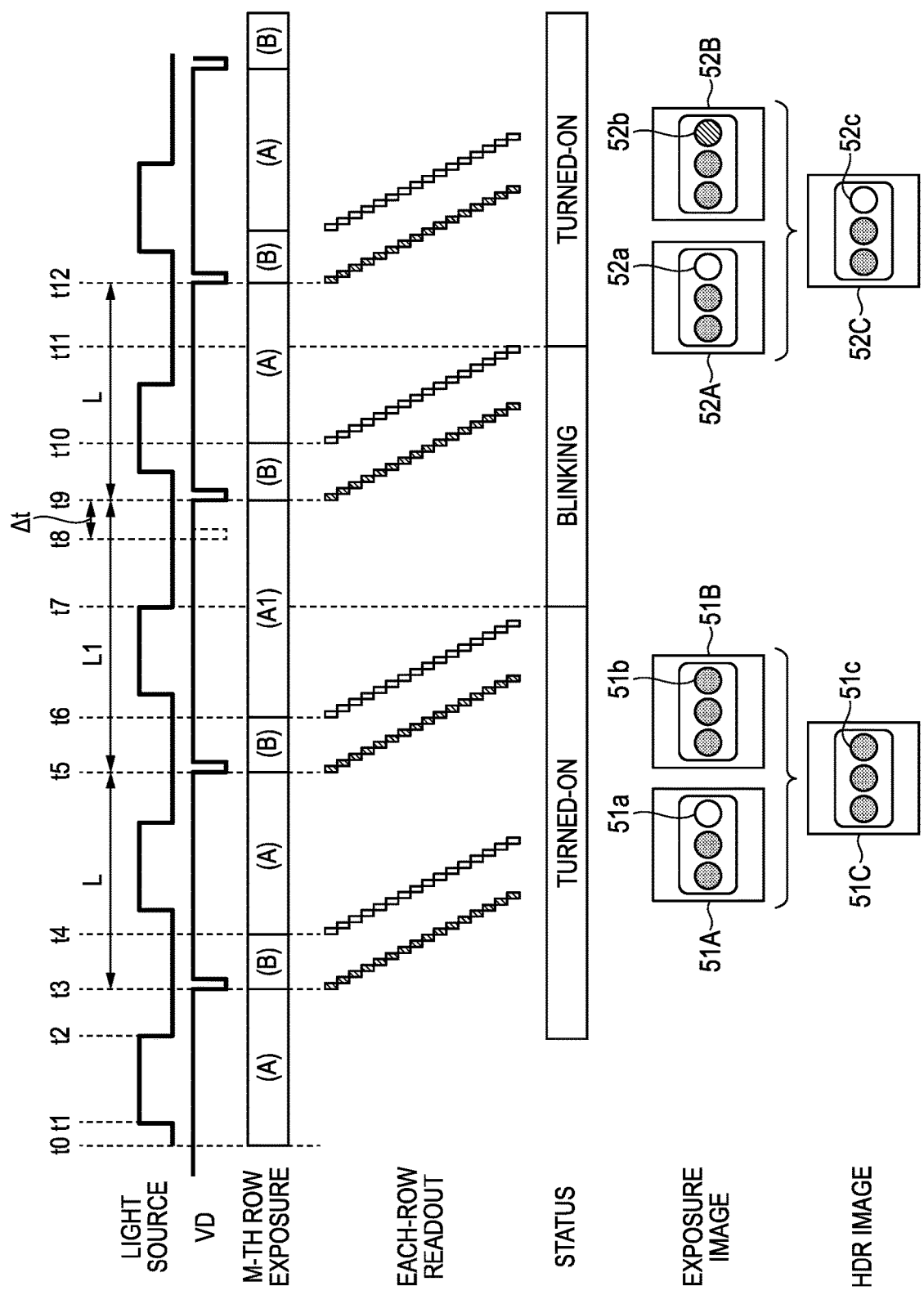
FIG. 6 is a timing chart illustrating a drive method of an imaging apparatus in the first embodiment.

FIG. 6 is a diagram illustrating the drive method of the imaging apparatus in the present embodiment and illustrates a light source, a vertical synchronization signal VD, the exposure timing, the readout timing, the blinking status, exposure images, and high dynamic range images. The light source is a traffic light using LED lamps as with the example described above and repeats turning-on and blinking at a predetermined light source cycle. Although only the exposure timing for one row (the m-th row) is illustrated here for easier understanding, exposure timings of respective rows are driven by being shifted from each other by a predetermined time.

At time t0, the long-time exposure (A) of the pixel 10 on the m-th row is started, and the photoelectric conversion unit PD starts accumulating charges in accordance with incident light. During time t1 to t2, the light source is in the turned-on state, and charges may be saturated in the photoelectric conversion unit PD.

At time t3, the synchronization signal generation circuit 212 outputs the vertical synchronization signal VD, ends the long-time exposure (A), and starts the short-time exposure (B). The vertical scanning circuit 101 controls the control signal TX to the high level and switches on the transfer transistor M1. Charges accumulated in the photoelectric conversion unit PD are transferred to the floating diffusion portion FD, and the potential of the floating diffusion portion FD decreases in accordance with the charges. The amplifier transistor M3 outputs a pixel signal in accordance with the potential of the floating diffusion portion FD to the column amplifier circuit 102 via the column signal line 110. The column amplifier circuit 102 amplifies the pixel signal and sequentially outputs pixel signals for one row in the long-time exposure (A) in accordance with the control signal from the horizontal scanning circuit 103. As described above, the exposure and readout of the pixels 10 are driven by being shifted by a predetermined time on a row basis. In the pixel 10, the control signal TX is controlled to the low level, and the short-time exposure (B) is started. During time t3 to t4, since the light source is in the turned-off state, few charges are accumulated in the photoelectric conversion unit PD.

At time t4, the vertical scanning circuit 101 controls the control signal TX to the high level and switches on the transfer transistor M1. Thereby, the charges accumulated in the photoelectric conversion unit PD in the short-time exposure (B) are transferred to the floating diffusion portion FD, and a pixel signal in the short-time exposure (B) is read out from the pixel 10. The pixel signals of the short-time exposure (B) are read out sequentially on a row basis.

During time t4 to t5, the transfer transistor M1 is switched off, and the photoelectric conversion unit PD accumulates charges. In the long-time exposure (A), since the light source is in the turned-on state, charges in the photoelectric conversion unit PD may be saturated as with the previous long-time exposure (A).

At time t5, the synchronization signal generation circuit 212 outputs the vertical synchronization signal VD to start the short-time exposure (B). Further, pixel signals in the long-time exposure (A) are sequentially read out. At time t6, the transfer transistor M1 is switched on, and pixel signals in the short-time exposure (B) are sequentially read out. At time t6, the charges accumulated in the photoelectric conversion unit PD in the short-time exposure (B) are transferred to the floating diffusion portion FD, and a pixel signal in the short-time exposure (B) is read out from the pixel 10.

The signal processing unit 22 converts the pixel signal read out by the process described above into digital data and stores the digital data in the frame memory 223. In the present embodiment, the image analysis unit 201 compares a long-time exposure image 51A with a short-time exposure image 51B and detects subjects 51a and 51b located at the same position. The blinking detection unit 202 determines whether or not respective pixel values of the subjects 51a and 51b are proportional to the exposure period. Herein, since the subject 51b of the short-time exposure image 51B is in the turned-off state, the respective pixel values of the subjects 51a and 51b are not proportional to the exposure period. Therefore, the blinking detection unit 202 determines that the subjects 51a and 51b are blinking. When the blinking detection unit 202 detects blinking in consecutive two frames, the blinking detection unit 202 changes the status from "turned-on" to "blinking" (time t7). The exposure control unit 211 receives the status of "blinking" and changes the start timing of the next short-time exposure (B). Time t8 is the start time of the short-time exposure (B) before the change. The exposure control unit 211 changes the start of the short-time exposure (B) from time t8 to time t9. That is, the start timing of the short-time exposure (B) is delayed by Δt from the start time in the previous frame, and the frame period L1 (time t5 to t9) becomes longer by Δt than the previous frame period L (time t3 to t5). That is, in response to the change of the status from "turned-on" to "blinking", the exposure control unit 211 changes the cycle of short-time exposure (which may be said to be the interval of respective start timings of multiple short-time exposures) from a predetermined cycle in a state of "turned-on".

At time t9, the short-time exposure (B) starts, and a pixel signal from a long-time exposure (A1) is read out. Since the phase of the short-time exposure (B) is delayed, a period in which the light source is in the turned-on state is included in the period of the short-time exposure (B). At time t10, a pixel signal in the short-time exposure (B) is read out. At time t11, the exposure control unit 211 changes the status from "blinking" to "turned-on". At time t12, the short-time exposure (B) starts in accordance with a typical frame cycle. That is, the frame period becomes L again. Also in the short-time exposure (B) on and after time t12, a period in which the light source is in the turned-on state is included.

In such a way, with a change of the start timing of the short-time exposure (B), a period in which the light source is in the turned-on state is included in the short-time exposure (B), and a subject 52b of a short-time exposure image 52B is in the turned-on state. The image composition circuit 221 amplifies a pixel value of the subject 52b in proportional to the length of an exposure period and replaces a subject 52a saturated in a long-time exposure image 52A with the amplified subject 52b. In a generated high dynamic range image 52C, a subject 52c is not in the turned-off state. It is therefore possible to generate the high dynamic range image 52C while suppressing flicker.

Figure 7A:
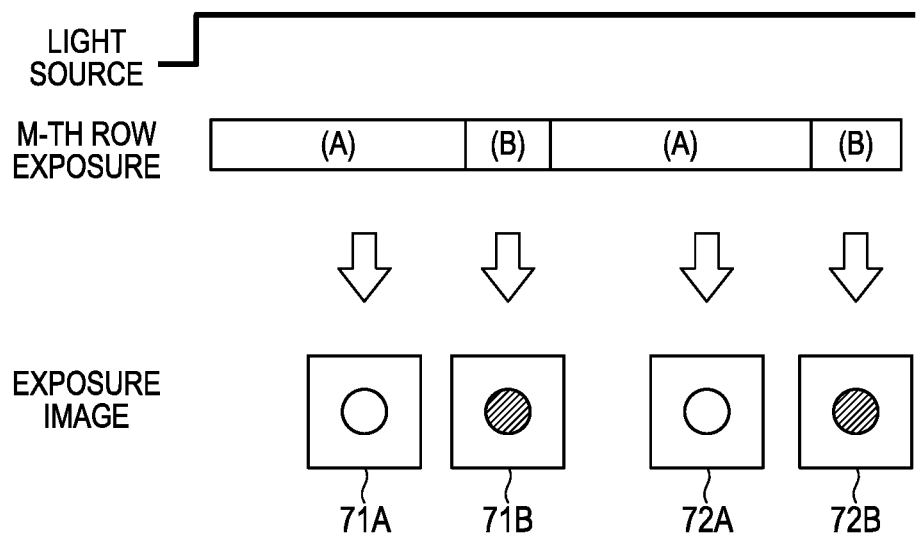
FIG. 7A is a diagram illustrating a blinking detection method in the first embodiment.
Figure 7B:
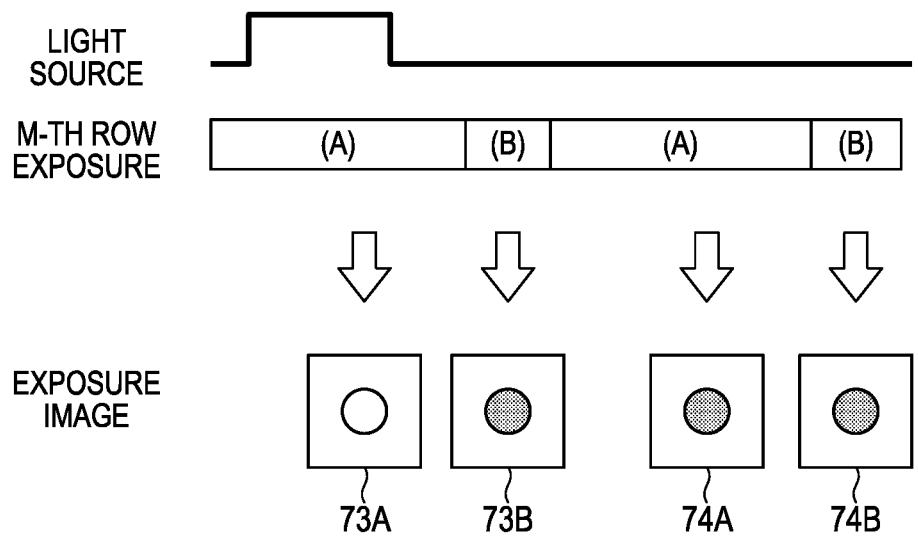
FIG. 7B is a diagram illustrating the blinking detection method in the first embodiment.
Figure 7C:
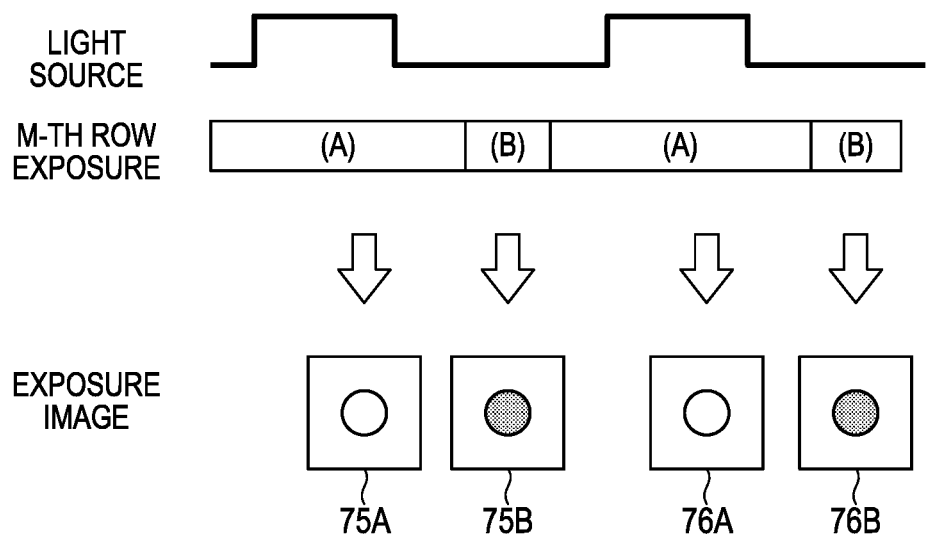
FIG. 7C is a diagram illustrating the blinking detection method in the first embodiment.

FIG. 7A, FIG. 7B, and FIG. 7C are diagrams illustrating a blinking detection method in the present embodiment. FIG. 7A illustrates exposure timings, readout timings on a row basis, and exposure images when the light source is in a turned-on state. The light source is in the turned-on state in the first and second frames, light from the light source enters the photoelectric conversion unit PD in both the long-time exposure (A) and the short-time exposure (B). Each pixel value of the long-time exposure images 71A and 72A and the short-time exposure images 71B and 72B is a value proportional to the length of the exposure period. However, when the pixel values of the long-time exposure images 71A and 72A are saturated, each pixel value is not necessarily proportional to the length of the exposure period. Furthermore, respective pixel values of the long-time exposure images 71A and 72A are the same, and respective pixel values of the short-time exposure images 71B and 72B are also the same. That is, when the light source is in the turned-on state, the pixel values in the first frame and the second frame are the same.

FIG. 7B illustrates exposure timings, readout timings on a row basis, and exposure images when the light source is in pulse flashing. A single pulse light enters the photoelectric conversion unit PD only in the long-time exposure (A) of the first frame. Therefore, only the long-time exposure image 73A is in the turned-on state, and a long-time exposure image 74A and short-time exposure images 73B and 74B are in the turned-off state. In the short-time exposure (B), no incident light enters the photoelectric conversion unit PD, each pixel value of the long-time exposure image 73A and the short-time exposure image 73B is not proportional to the length of the exposure period. Further, the pixel values of the long-time exposure images 73A and 74A of different frames are not the same.

FIG. 7C illustrates exposure timings, readout timings on a row basis, and exposure images when the light source is blinking. The light source is in the turned-on state in the long-time exposure (A) of the first and second frames and in the turned-off state in the short-time exposure (B) of the first and second frames. In such a case, long-time exposure images 75A and 76A are in the turned-on state, and short-time exposure image 75B and 76B are in the turned-off state. Since the light source is blinking, each pixel value of the long-time exposure image 75A and the short-time exposure image 75B is not proportional to the length of the exposure period. Further, the pixel values of the long-time exposure images 75A and 76A are the same, and the pixel values of the short-time exposure images 75B and 76B are also the same.

In such a way, by comparing four images in consecutive two frames, it is possible to detect turned-on, single-pulse flashing, and blinking of a light source. Details of the blinking detection method in the present embodiment will be described with reference to FIG. 8 and FIG. 7A, FIG. 7B, and FIG. 7C described above.

Figure 8:
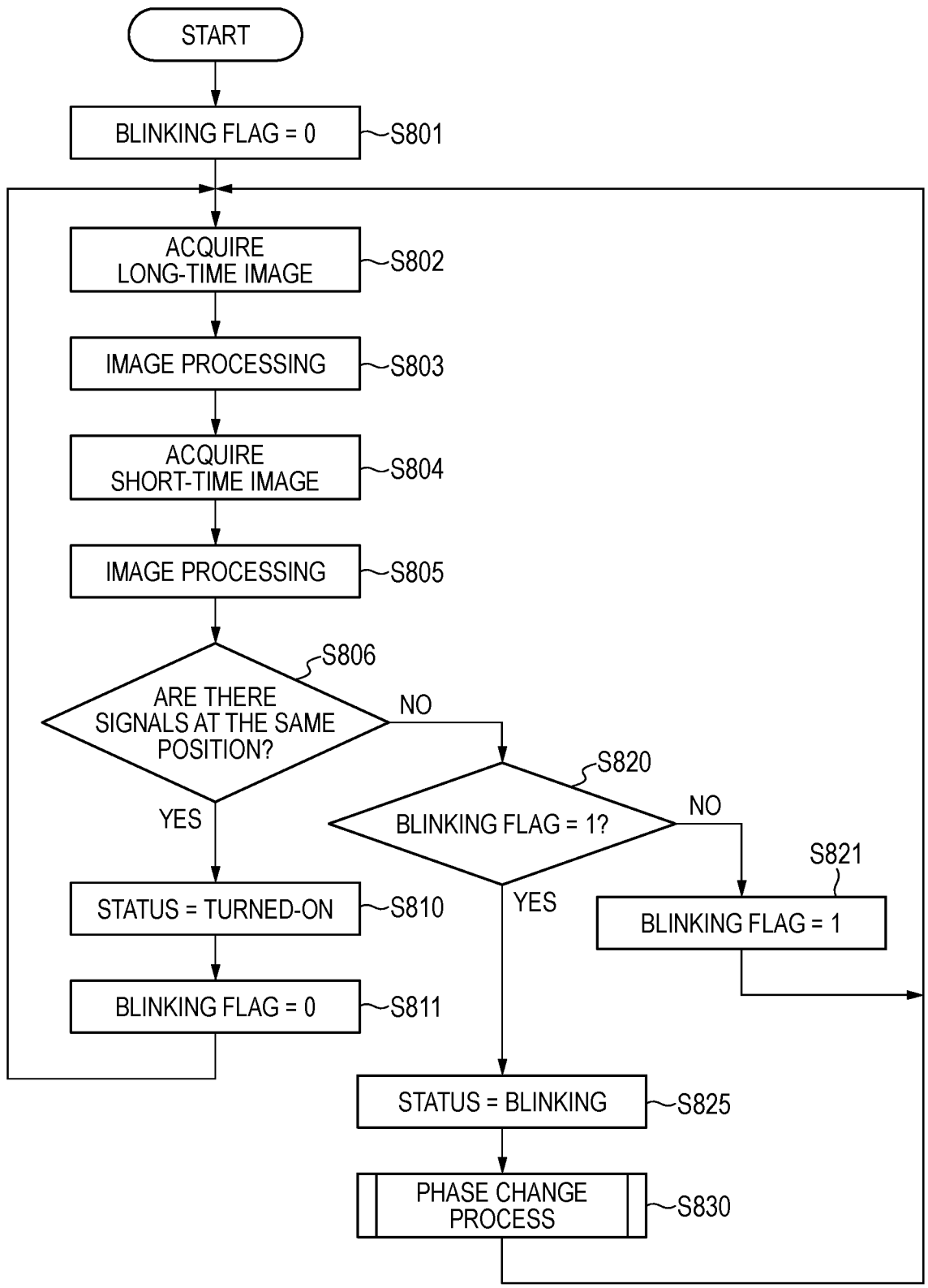
FIG. 8 is a flowchart of the blinking detection method in the first embodiment.

FIG. 8 is a flowchart illustrating a blinking detection method in the present embodiment. In step S801, the blinking detection unit 202 starts the operation and then sets the initial value of the status to "turned-on". The status represents a detection result detected by the blinking detection unit 202 and may take a value of "turned-on" or "blinking". The detection result "turned-on" indicates that no blinking of a subject is detected in other words. Subsequently, the blinking detection unit 202 sets the initial value of a blinking FLAG to "0" (step S802). The blinking FLAG indicates whether or not blinking is detected in consecutive two frames.

In the first frame, the imaging device 1 captures a long-time exposure image and outputs the long-time exposure image to the signal processing unit 22 in accordance with the synchronization signal from the synchronization signal generation circuit 212 (step S804). The image processing circuit 222 performs image processing such as gain processing in accordance with the length of an exposure period, correlated double sampling, or the like on the long-time exposure image and stores the long-time exposure image in the frame memory 223 (step S805). Similarly, the imaging device 1 captures a short-time exposure image (step S806), and the image processing circuit 222 stores the image-processed short-time exposure image in the frame memory 223 (step S807).

The image analysis unit 201 determines whether or not there are signals corresponding to the same position of the long-time exposure image and the short-time exposure image stored in the frame memory 223 (step S810). When the light source is in the turned-on state (FIG. 7A), two pixel values at the same position of the long-time exposure image and the short-time exposure image are proportional to the length of the exposure periods. The correlation of respective pixel values of the long-time exposure image and the short-time exposure image is high, and signals corresponding to the same position are present (step S810, YES). The blinking detection unit 202 sets the status to "turned-on" (step S812) and sets the blinking FLAG to "0" (step S813). In this case, each value of the status and the blinking FLAG remains at the initial value. If the status is "turned on", the exposure control unit 211 continues readout of the long-time exposure image and the short-time exposure image without changing the start timing of frames. The blinking detection unit 202 repeats the process of steps S804 to S810.

On the other hand, as illustrated in FIG. 7B and FIG. 7C, when the light source is in pulse flashing or blinking, while the light source of the long-time exposure image is in the turned-on state in the first frame, the light source of the short-time exposure image is in the turned-off state. The blinking detection unit 202 determines that there are no signals corresponding to the same position of the long-time exposure image and the short-time exposure image (step S810, NO). In such a case, it is not possible to distinguish the single-pulse flashing (FIG. 7B) and the blinking (FIG. 7C), and the blinking detection unit 202 performs the process on and after step S820. In step S820, the blinking detection unit 202 determines whether or not the blinking FLAG is "1". In this step, since the blinking FLAG is "0" (step S820, NO), the blinking detection unit 202 sets the blinking FLAG to "1" (step S821) and returns to the process of step S804 in the second frame.

In the second frame, the blinking detection unit 202 again determines whether or not there are signals corresponding to the same position of the long-time exposure image and the short-time exposure image, respectively (step S810). As illustrated in FIG. 7B, when the light source performs single-pulse flashing, both of respective light sources of the long-time exposure image and the short-time exposure image are in the turned-off state in the second frame. Therefore, the blinking detection unit 202 determines that there are signals corresponding to the same position of the long-time exposure image and the short-time exposure image (step S810, YES) and sets the status to "turned-on" (step S812) and resets the blinking FLAG to "0" (step S813). The blinking detection unit 202 then repeats the process of steps S801 to S810.

As illustrated in FIG. 7C, when the light source is blinking, the light source of the long-time exposure image is in a turned-on state, and the light source of the short-time exposure image is in the turned-off state. In such a case, the blinking detection unit 202 determines that there are no signals corresponding to the same position of the long-time exposure image and the short-time exposure image (step S810, NO) and further determines whether or not the blinking FLAG is "1" (step S820). Since the blinking FLAG in the first frame is set to "1", the determination result of step S820 is YES, and the blinking detection unit 202 sets the status to "blinking" (step S825). In response to the status being set to "blinking", the exposure control unit 211 performs a phase change process of a frame (step S830). The blinking detection unit 202 then repeats the process on and after step S804.

In such a way, when the light source repeats turning-on and turning-off in consecutive two frames, the blinking detection unit 202 changes the status from "turned-on" to "blinking". Accordingly, it is possible to determine turned-on, short-pulse flashing, or blinking of the light source.

Figure 9:
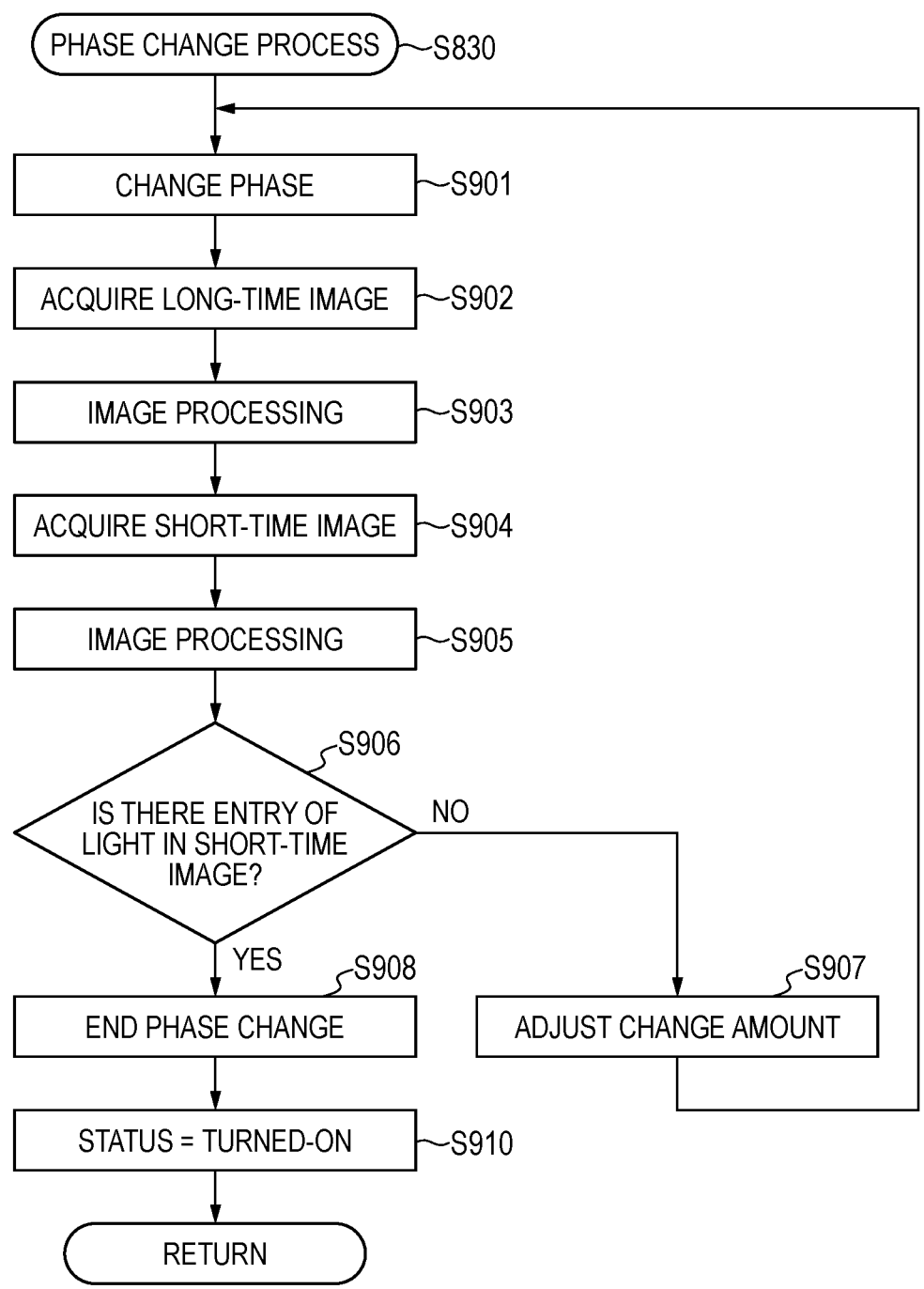
FIG. 9 is a flowchart of a phase change process in the first embodiment.

FIG. 9 is a flowchart of a phase change process in the present embodiment and represents details of the phase change process (step S830) of FIG. 8. In response to the status of "blinking", the exposure control unit 211 performs the phase change process of a frame (step S901). That is, the exposure control unit 211 changes the phase of the vertical synchronization signal VD and shifts the start timing of the short-time exposure by $\Delta t$. The imaging device 1 then captures a long-time exposure image in accordance with the synchronization signal from the synchronization signal generation circuit 212 (step S902), and the image processing circuit 222 performs image processing such as gain processing, correlated double sampling, or the like in accordance with the length of the exposure period on the long-time exposure image (step S903). Similarly, the imaging device 1 captures a short-time exposure image (step S904), and the image processing circuit 222 stores the image-processed short-time exposure image in the frame memory 223 (step S905).

The image analysis unit 201 determines whether or not there is entry of light from the light source in the short-time exposure image stored in the frame memory 223 (step S906). If the image analysis unit 201 determines that there is no entry of light from the light source in the short-time exposure image (step S906, NO), the exposure control unit 211 adjusts the phase change amount $\Delta t$ (step S907). The exposure control unit 211 further delays the start timing of the short-time exposure by the phase change amount adjusted in step S907 (step S901). Until it is determined that there is entry of light from the light source in the short-time exposure image (step S906, YES), the exposure control unit 211 repeats the process of steps S901 to S907. If the image analysis unit 201 determines that there is entry of light from the light source in the short-time exposure image (step S906, YES), the exposure control unit 211 ends the phase change process (step S908). Furthermore, the exposure control unit 211 changes the status from "blinking" to "turned-on" (step S910) and returns the process to the flowchart of FIG. 8.

As described above, the exposure control unit 211 shifts the start timing of a short-time exposure until entry of light is made on a short-time exposure image. Accordingly, it is possible to avoid unevenness of incident light in each of a long-time exposure image and a short-time exposure image and suppress flicker. Further, in a high dynamic range image composed from a long-time exposure image and a short-time exposure image, it is possible to avoid deterioration of image quality such as a light source appearing to be turned off.

Figure 10A:
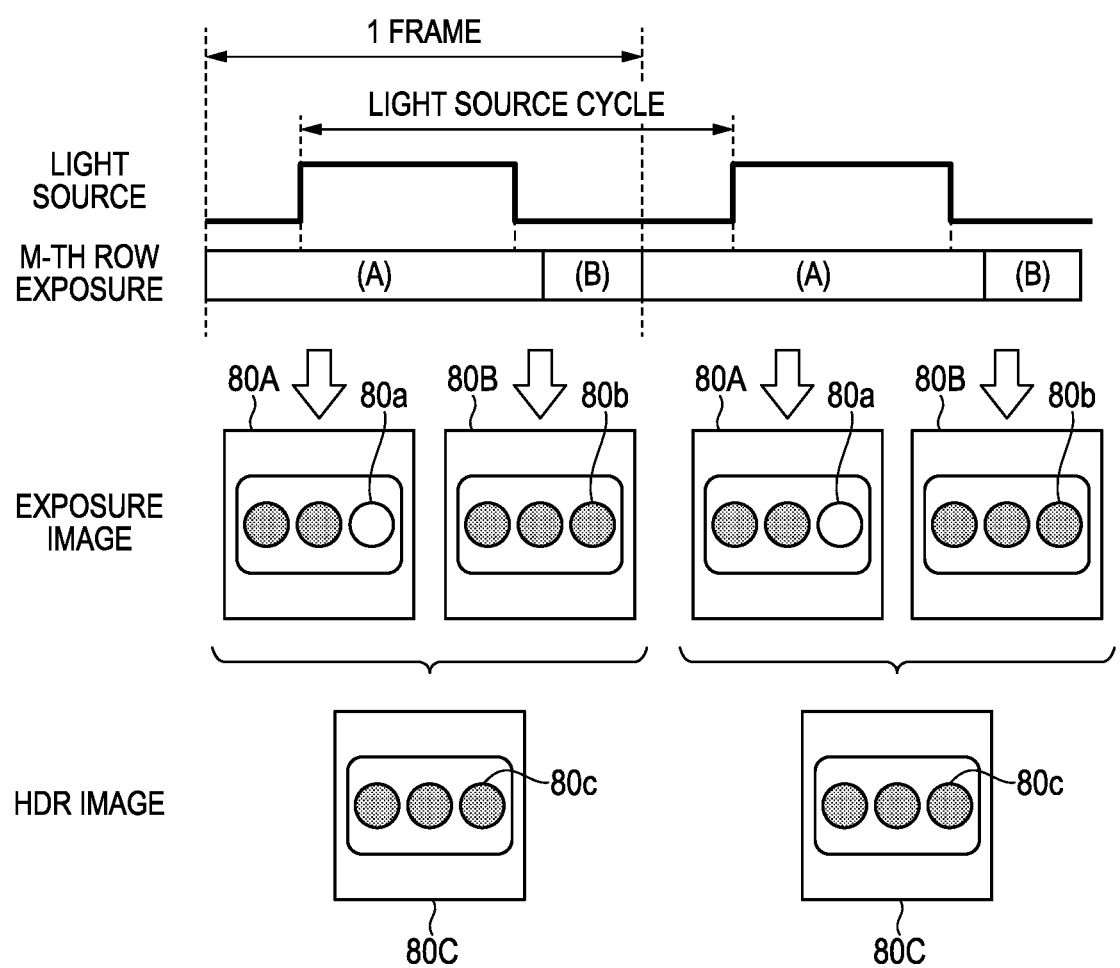
FIG. 10A is a timing chart when a light source is blinking in the first embodiment.
Figure 10B:
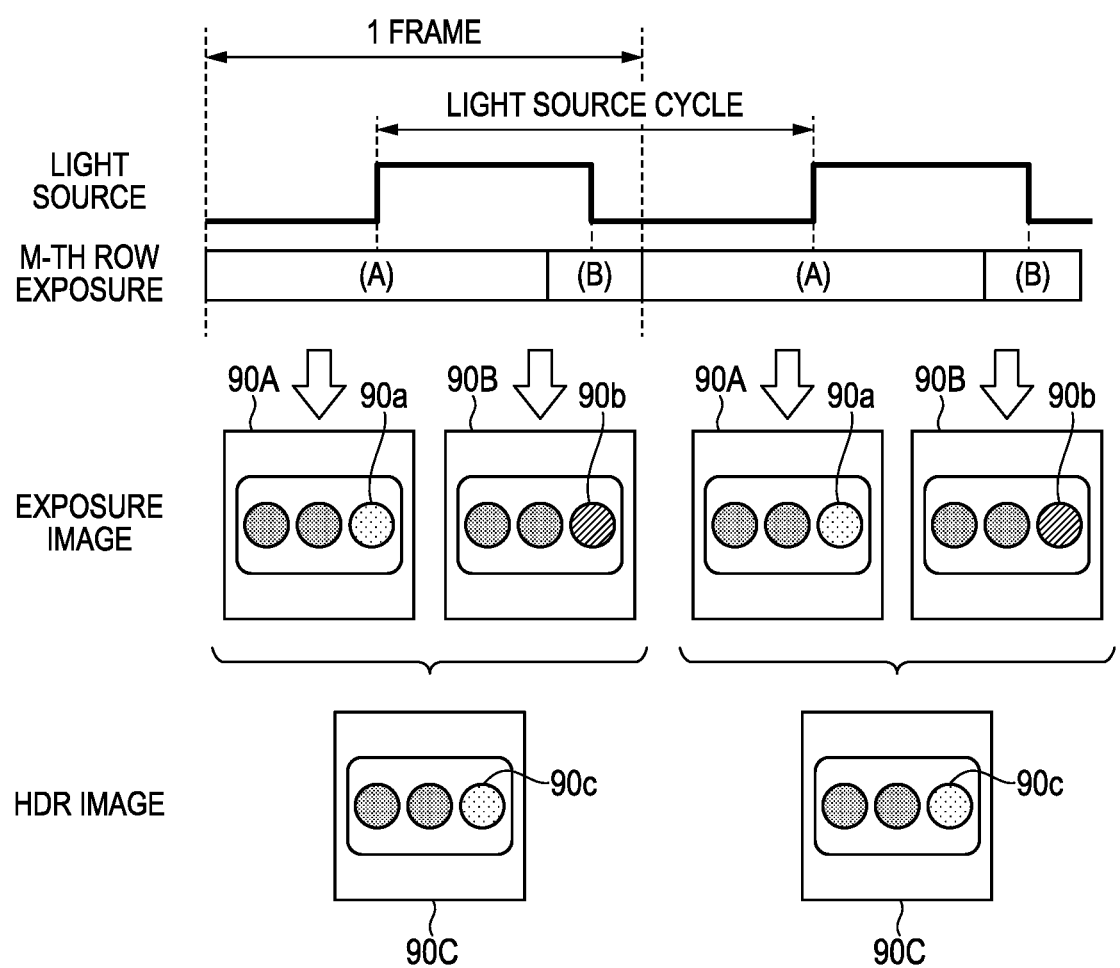
FIG. 10B is a timing chart after a phase change in the first embodiment.

FIG. 10A and FIG. 10B schematically illustrate the effect in the present embodiment. FIG. 10A illustrates exposure timings, exposure images, and high dynamic range images before a phase change. While a subject 80a of a long-time exposure image 80A is in a turned-on state, a subject 80b of a short-time exposure image 80B is in a turned-off state. Thus, if a high dynamic range image 80C is composed from the long-time exposure image 80A and the short-time exposure image 80B, a subject 80c of the light source will appear to be turned off. FIG. 10B illustrates exposure timings, exposure images, and high dynamic range images after a phase change. With a change of the start timing of the short-time exposure (B), light from the light source enters a short-time exposure image 90B, and a subject 90b is in the turned-on state. Since the period in which the light source is in the turned-on state is shorter in the long-time exposure (A), the accumulated charge amount decreases, however, it is assumed here that the subject 90b is at the saturation level. With the long-time exposure image 90A and the short-time exposure image 90B being composed, the subject 90c is in the turned-on state in the high dynamic range image 90C.

As described above, according to the present embodiment, it is possible to suppress flicker in two images resulted from different lengths of exposure periods. Further, in a high dynamic range image in which a long-time exposure image and a short-time exposure image are composed, it is possible to avoid deterioration of image quality such as a high luminance subject appearing dark. Note that, although the imaging apparatus of the present embodiment delays the start timing of a short-time exposure when detecting blinking of a subject, the start timing may be advanced. Furthermore, the order of a long-time exposure and a short-time exposure in one frame is not necessarily limited to the example described above.

Second Embodiment

An imaging apparatus in a second embodiment will be described mainly for features different from the first embodiment. The imaging apparatus in the first embodiment also changes the length of one frame when changing the phase of a short-time exposure. In the present embodiment, by providing respective charge holding portions for the long-time exposure and the short-time exposure, it is possible to change the phase of exposures without changing the length of one frame.

Figure 11:
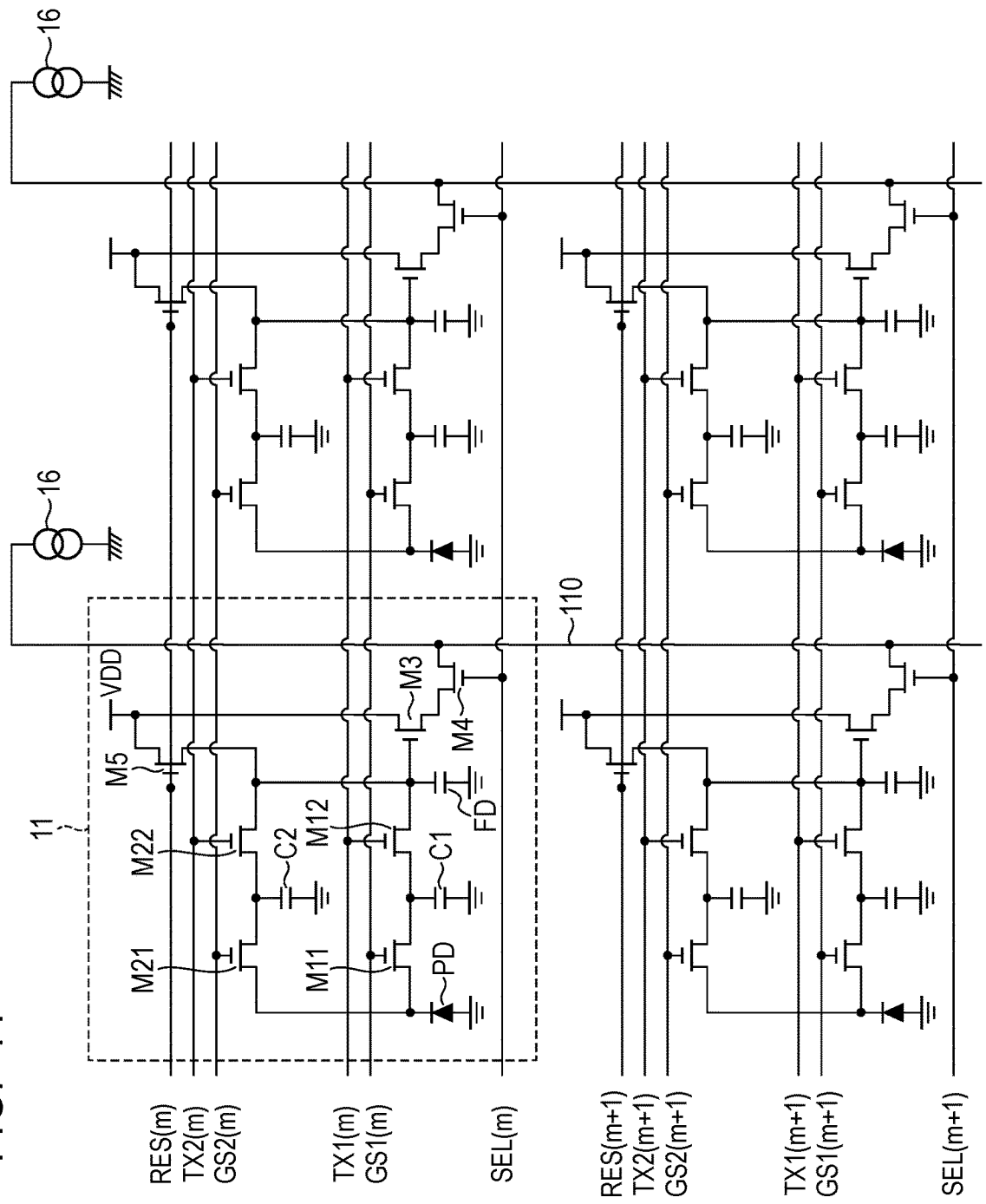
FIG. 11 is a diagram illustrating an equivalent circuit of pixels in a second embodiment.

FIG. 11 illustrates an equivalent circuit of pixels 11 in the present embodiment. Although FIG. 11 illustrates four pixels 11 of two rows×two columns of the plurality of pixels 11 arranged two-dimensionally in the row direction and the column direction, the imaging apparatus has more pixels. Each pixel 11 has the photoelectric conversion unit PD, the floating diffusion portion FD, a first memory transfer transistor M11, a second memory transfer transistor M21, a first transfer transistor M12, a second transfer transistor M22, the amplifier transistor M3, the select transistor M4, the reset transistor M5, a first holding portion C1, and a second holding portion C2.

The photoelectric conversion unit PD photoelectrically converts incident light and accumulates charges caused by photoelectric conversion. The first memory transfer transistor M11 transfers charges of the photoelectric conversion unit PD to the first holding portion C1, and the first transfer transistor M12 transfers charges of the first holding portion C1 to the floating diffusion portion FD. Similarly, the second memory transfer transistor M21 transfers charges of the photoelectric conversion unit PD to the second holding portion C2, and the second transfer transistor M22 transfers charges of the second holding portion C2 to the floating diffusion portion FD. The power source voltage VDD is applied to the drain of the amplifier transistor M3, and the source is connected to the column signal line 110 via the select transistor M4. The amplifier transistor M3 forms a source follower and outputs a signal based on a voltage of the floating diffusion portion FD to the column signal line 110 via the select transistor M4. A constant current source 16 is connected to the column signal line 110. The power source voltage VDD is applied to the drain of the reset transistor M5, and when switched on, the reset transistor M5 resets the voltage of the floating diffusion portion FD.

Common control signals are supplied from the vertical scanning circuit 101 to the pixels 11 on the same row. That is, control signals GS1($m$), GS2($m$), TX1($m$), TX2($m$), SEL($m$), and RES($m$) are supplied to the first memory transfer transistor M11, the second memory transfer transistor M21, the first transfer transistor M12, the second transfer transistor M22, the select transistor M4, and the reset transistor M5 of the pixels 11 on the m-th row, respectively. These transistors are each switched on when the control signal is at a high level and are each switched off when the control signal is at a low level. By controlling the control signals on each row to be switched on or off at the same time, it is possible to perform control of exposure periods in a plurality of pixels 11 at the same time. Note that a plurality of pixels 11 may share one amplifier transistor M3. Further, an overflow drain transistor may be provided to the photoelectric conversion unit PD. In the pixel unit 100, pixels that do not output images, such as a light shielding pixel, a dummy pixel having no photoelectric conversion unit, or the like may be included in addition to effective pixels.

In the pixel 11, by controlling timings of switching on or off of the first memory transfer transistor M11 and the second memory transfer transistor M21, it is possible to acquire images of a short-time exposure and a long-time exposure. By switching on the first memory transfer transistor M11, it is possible to transfer charges of a long-time exposure from the photoelectric conversion unit PD to the first holding portion C1. Further, by switching on the second memory transfer transistor M21, it is possible to transfer charges of a short-time exposure from the photoelectric conversion unit PD to the second holding portion C2.

The order and the number of times of transferring charges from the photoelectric conversion unit PD to the first holding portion C1 and the second holding portion C2 may be defined as appropriate. For example, after the first memory transfer transistor M11 is switched on, the second memory transfer transistor M21 may be switched on, and furthermore the first memory transfer transistor may be switched on. By the first memory transfer transistor M11 and the second memory transfer transistor M21 being exclusively switched on or off, charges of a long-time exposure may be accumulated in the first holding portion C1, and charges of a short-time exposure may be accumulated in the second holding portion C2. In such a case, the amount of charges held in the first holding portion C1 is the amount of charges exposed during the total period in which the first memory transfer transistor M11 is in the on-state. The amount of charges held in the second holding portion C2 is the amount of charges exposed during the period in which the second memory transfer transistor M21 is in the on-state. Further, charges may be accumulated in the photoelectric conversion unit PD during a period in which the memory transfer transistors M11 and M21 are in the off-state, the memory transfer transistors M11 and M21 may be switched on, and thereby charges may be transferred to the first holding portion C1 and the second holding portion C2. In such a case, the amount of charges held in the first holding portion C1 and the second holding portion C2 is the amount of charges accumulated in the photoelectric conversion unit PD during a period in which the memory transfer transistors M11 and M21 are in the off-state.

Figure 12:
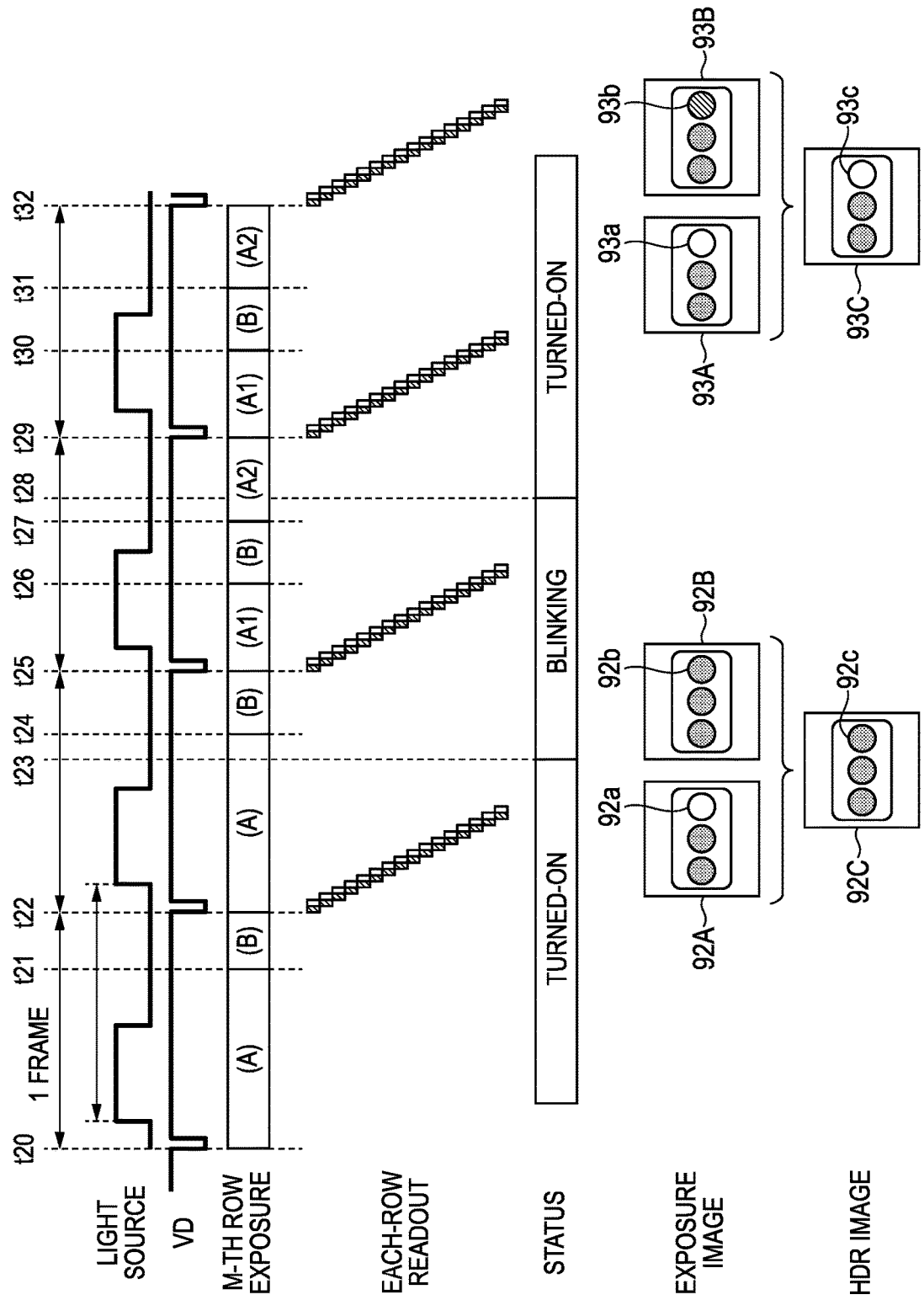
FIG. 12 is a timing chart illustrating a drive method of a solid state imaging device in the second embodiment.

FIG. 12 is a diagram illustrating a drive method of the imaging apparatus in the present embodiment and illustrates a light source, the vertical synchronization signal VD, the exposure timing, the readout timing, the blinking status, exposure images, and high dynamic range images. In the present embodiment, the synchronization signal generation circuit 212 outputs the vertical synchronization signal VD at a constant cycle, and the length of one frame is constant.

At time t20, the long-time exposure (A) in the first frame starts, and the photoelectric conversion unit PD starts accumulating charges in accordance with incident light. At time t21, the charges accumulated in the photoelectric conversion unit PD are transferred to the first holding portion C1, and the photoelectric conversion unit PD starts accumulating charges in the short-time exposure (B). During time t21 to t22, since the light source is in the turned-off state, few charges are accumulated in the photoelectric conversion unit PD.

At time t22, charges accumulated in the photoelectric conversion unit PD are transferred to the second holding portion C2, and the short-time exposure (B) ends. Subsequently, during time t22 to t24, the long-time exposure (A) of the second frame is performed, and during time t24 to t25, the short-time exposure (B) is performed.

During time t22 to t24, while the photoelectric conversion unit PD is accumulating charges, the pixel signals of the first frame are read out on a row basis. For example, on the m-th row, the first transfer transistor M12 is switched on, and the charges held in the first holding portion C1 are transferred to the floating diffusion portion FD. The amplifier transistor M3 outputs a pixel signal in the long-time exposure (A) to the column signal line 110. Subsequently, the second transfer transistor M22 is switched on, and the charges held in the second holding portion C2 are transferred to the floating diffusion portion FD. The amplifier transistor M3 outputs a pixel signal in the short-time exposure (B) to the column signal line 110. The signal processing unit 22 converts pixel signals read out by the process described above into digital data and stores the digital data in the frame memory 223.

While a subject 92a is at the saturation level in a long-time exposure image 92A in the first frame, a subject 92b is in the turned-off state in a short-time exposure image 92B. Thus, a subject 92c of a high dynamic range image 92C is also in the turned-off state. Also in the present embodiment, in response to detecting blinking in consecutive two frames, the blinking detection unit 202 changes the status from "turned-on" to "blinking" (time t23).

At time t23, the exposure control unit 211 receives the status of "blinking" and changes the start timing of the short-time exposure (B). For example, the exposure control unit 211 performs exposure in the order of the first long-time exposure (A1) during time t25 to time t26, the short-time exposure (B) during time t26 to t27, and the second long-time exposure (A2) during time t27 to t29. The total period of the first long-time exposure (A1) and the second long-time exposure (A2) is equal to the period of the long-time exposure (A). Further, the length of the short-time exposure (B) and the length of one frame are constant in each frame. In the third frame, by changing the start timing of the short-time exposure (B), the exposure control unit 211 can cause light from the light source to enter a short-time exposure image 93B. If the image analysis unit 201 determines that there is entry of light from the light source to the short-time exposure image 93B, the exposure control unit 211 ends the phase change process. Furthermore, the blinking detection unit 202 changes the status from "blinking" to "turned-on" (time t28).

In the fourth frame, an exposure is performed in the same manner as in the third frame. That is, the first long-time exposure (A1) during time t29 to t30, the short-time exposure (B) during time t30 to t31, and the second long-time exposure (A2) during time t31 to t32 are performed.

In such a way, a change of the start timing of the short-time exposure (B) causes a period in which the light source is in the turned-on state to be included in the short-time exposure (B), and a subject 93b of the short-time exposure image 93B is in the turned-on state in the same manner as the long-time exposure image 93A. Therefore, also in the present embodiment, it is possible to avoid unevenness of incident light in two images resulted from different lengths of exposure periods and suppress flicker. Further, the image composition circuit 221 amplifies a pixel value of the subject 93b in proportional to the exposure period and replaces a subject 93a saturated in a long-time exposure image 93A with the amplified subject 93b. In a generated high dynamic range image 93C, the subject 93c is in the turned-on state. It is therefore possible to generate the high dynamic range image 93C while suppressing flicker. Further, in the present embodiment, it is possible to change the start timing of a short-time exposure without changing the length of one frame.

Note that the order, the number of times, or the timing of long-time exposures and short-time exposures in one frame is not limited to the example described above. As long as the total period of the short-time exposure is constant, the short-time exposure may be performed by being divided into multiple times. Further, multiple times of short-time exposures or long-time exposures may be repeated in one frame. Further, the drive method of changing the length of one frame may be performed together in the same manner as the first embodiment.

Third Embodiment

An imaging apparatus in a third embodiment will be described mainly for features different from the second embodiment. In the second embodiment, the numbers of switching times of the memory transfer transistors M11 and M21 in one frame are not limited. However, an increase in the number of switching times of the memory transfer transistors M11 and M21 may cause an increase in power consumption and an occurrence of irradiation noise. In the present embodiment, the numbers of switching times of the memory transfer transistors M11 and M21 in one frame are set to the optimal initial values in advance based on a factor such as power consumption, noise, a light source cycle, or the like. A phase change is performed by changing the exposure timing in the initial value.

Figure 13:
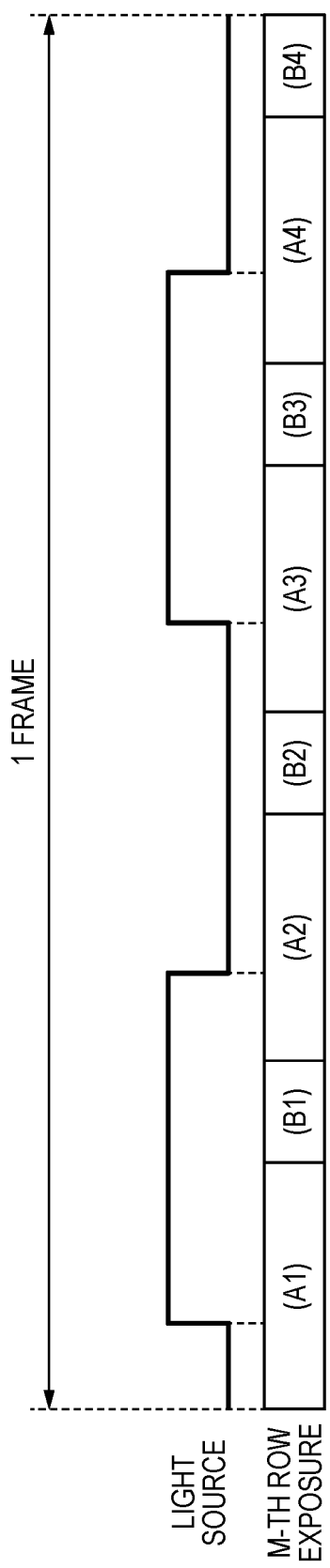
FIG. 13 is a timing chart illustrating the drive method of an imaging apparatus in a third embodiment.
Figure 14:
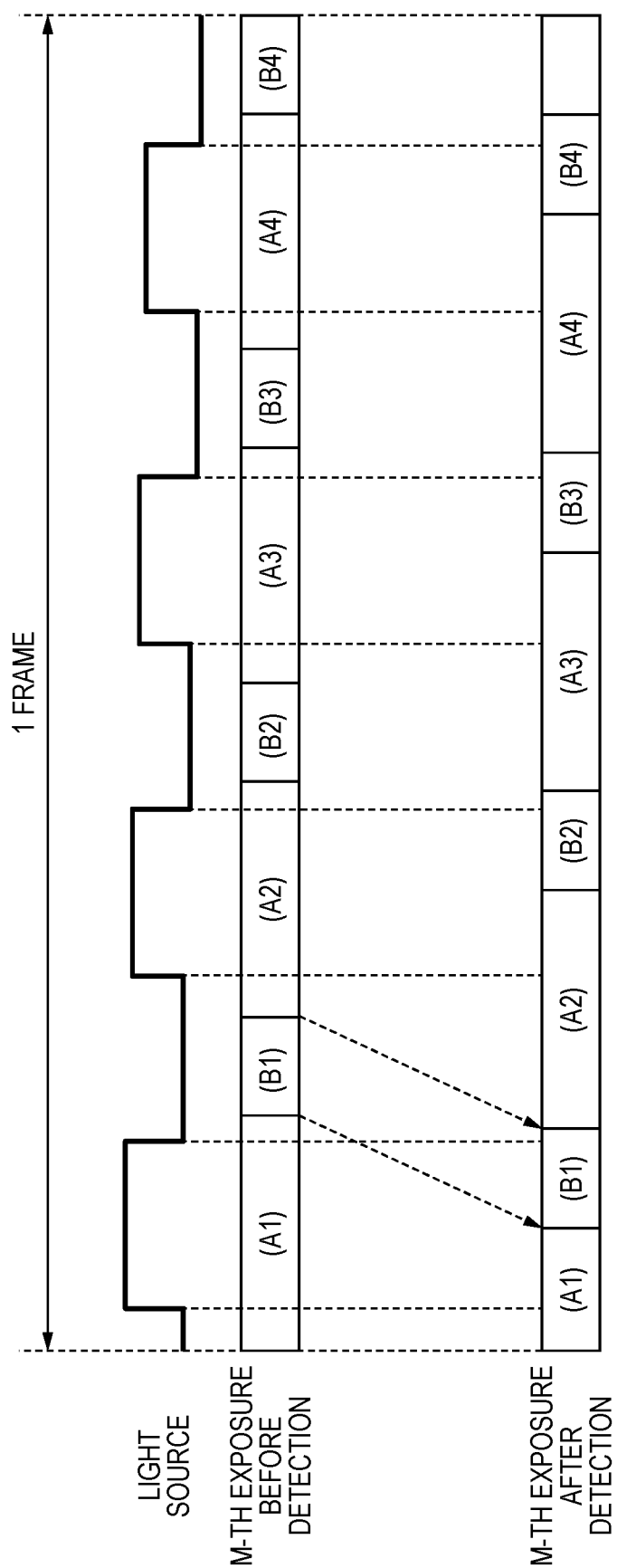
FIG. 14 is a timing chart illustrating the drive method of an imaging apparatus in the third embodiment.

FIG. 13 and FIG. 14 are timing charts illustrating a drive method of the imaging apparatus in the present embodiment. In FIG. 13, the initial value of the number of switching times of each of the memory transfer transistors M11 and M21 in one frame is set to four. That is, switching of the memory transfer transistors M11 and M21 is performed in the order of a long-time exposure (A1), a short-time exposure (B1), a long-time exposure (A2), a short-time exposure (B2), a long-time exposure (A3), a short-time exposure (B3), a long-time exposure (A4), and a short-time exposure (B4). When blinking of the light source is repeated for multiple times in one frame, the initial value illustrated in FIG. 13 is effective. Note that the number of switching times of each of the memory transfer transistors M11 and M21 is not necessarily limited to four.

FIG. 14 illustrates exposures when a light source of half the blinking cycle, that is, twice the frequency of the light source of FIG. 13 is captured. In exposures before detection of blinking, since there is no entry of light in the short-time exposure (B1), a high dynamic range image composed from this short-time exposure image will be a turned-off image. In response to detecting blinking by using the method illustrated in FIG. 8, the imaging apparatus of the present embodiment moves the short-time exposure (B1) to the timing at half the length of the long-time exposure (A1). In such a way, in the example of FIG. 14, the blinking frequency that enables high dynamic range capturing is twofold.

Also in the present embodiment, it is possible to realize high dynamic range capturing while suppressing flicker. Further, in the present embodiment, by setting the numbers of switching times of the memory transfer transistors M11 and M21 in one frame to the optimal initial values in advance, it is possible to reduce the frequency of phase change while suppressing influence of power consumption, noise, or the like to the minimum.

Fourth Embodiment

The imaging apparatuses in the first to third embodiments detect blinking of a light source by using a long-time exposure image and a short-time exposure image. In the present embodiment, it is possible to further perform object detection such as calculation of a moving speed of a subject by using a long-time exposure image and a short-time exposure image. Features different from the embodiments described above will be mainly described below.

Figure 15:
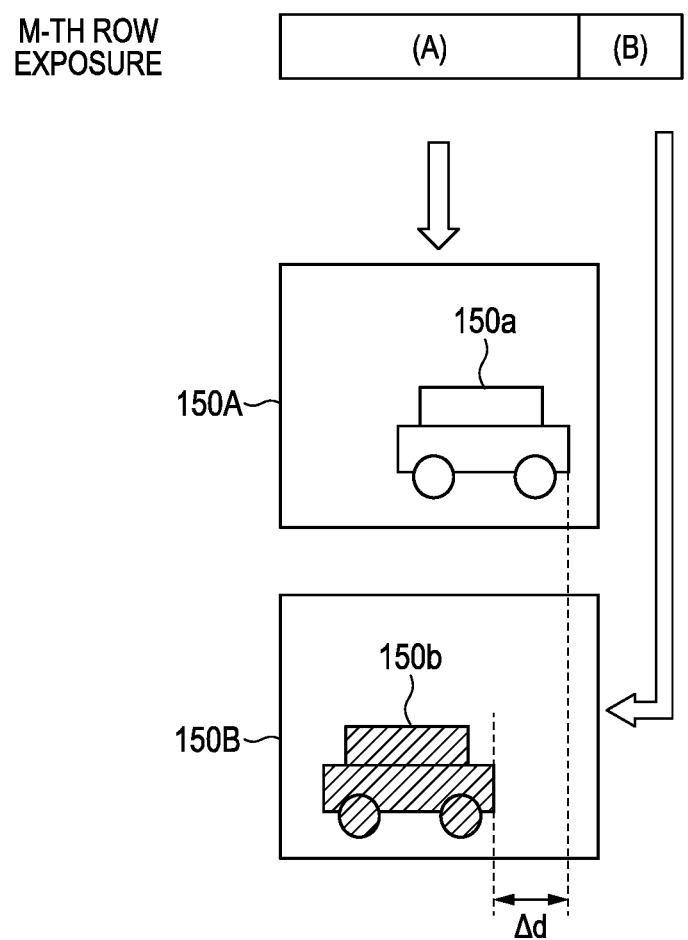
FIG. 15 is a diagram illustrating the operation of an imaging apparatus in a fourth embodiment.

FIG. 15 is a diagram illustrating the operation of the imaging apparatus in the present embodiment. A long-time exposure image 150A and a short-time exposure image 150B are captured by being shifted from each other by a predetermined period within one frame. Thus, a subject 150a of the long-time exposure image 150A has moved to the position of a subject 150b in the short-time exposure image 150B. The detection unit 20 can calculate the moving speed of the subject 150a based on the motion amount Δd between the subject 150a and the subject 150b and the difference in capturing time. Furthermore, the detection unit 20 can determine a moving unit such as a vehicle or a static object such as a traffic light. The detection unit 20 can adjust the phase change amount of a short-time exposure to the optimal value in accordance with the speed of a subject and capture a more accurate high dynamic range image.

Fifth Embodiment

Figure 16:
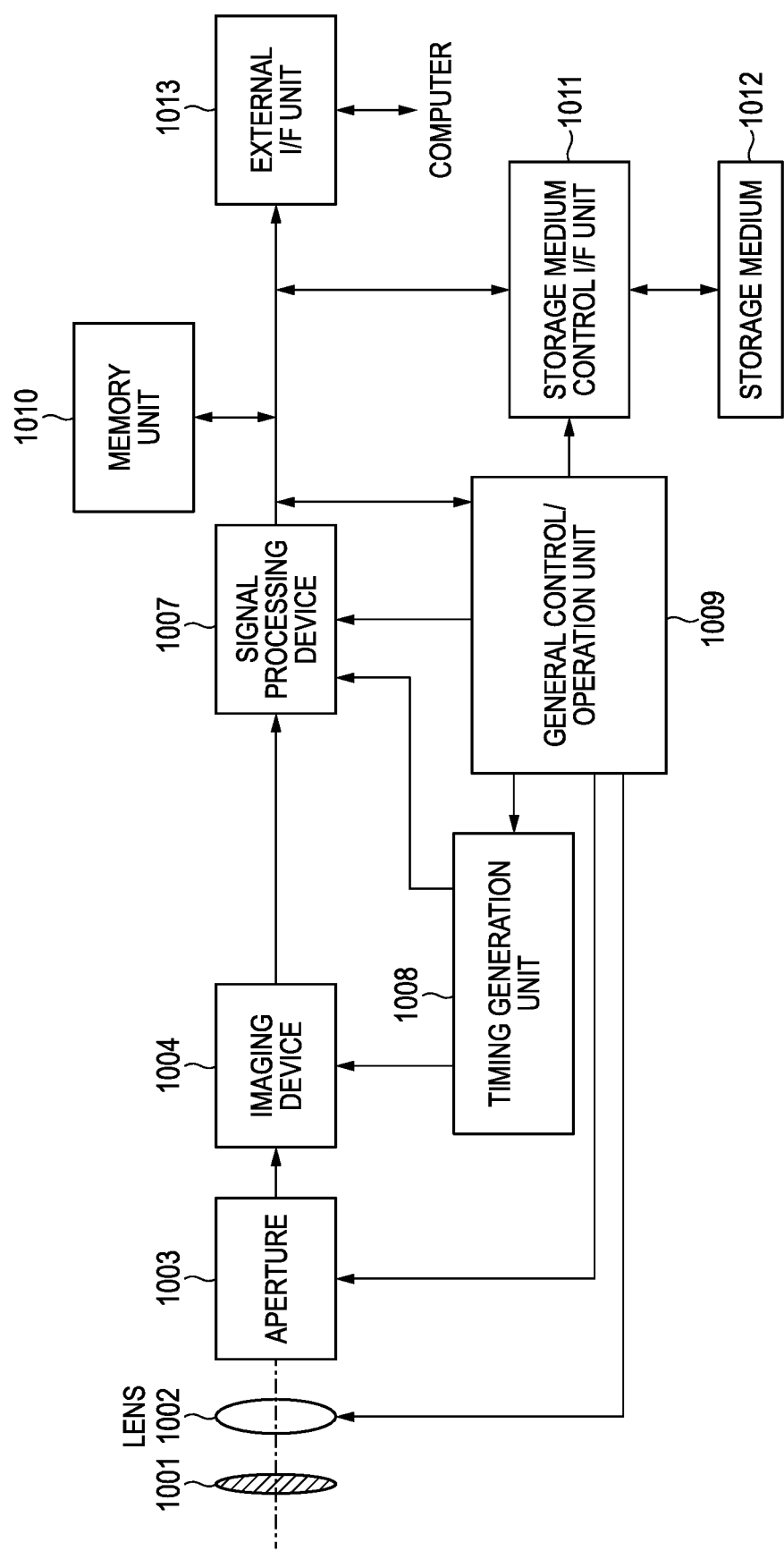
FIG. 16 is a block diagram of an imaging system in a fifth embodiment.

Each solid state imaging device in the embodiments described above is applicable to various imaging systems. The imaging system may be a digital still camera, a digital camcorder, a camera head, a copy machine, a fax machine, a mobile phone, an on-vehicle camera, an observation satellite, a surveillance camera, or the like. FIG. 16 illustrates block diagram of a digital still camera as an example of an imaging system.

An imaging system illustrated in FIG. 16 includes a barrier 1001, a lens 1002, an aperture 1003, an imaging device 1004, a signal processing device 1007, a timing generation unit 1008, a general control/operation unit 1009, a memory unit 1010, a storage medium control I/F unit 1011, a storage medium 1012, and an external I/F unit 1013. The barrier 1001 protects the lens 1002, and the lens 1002 captures an optical image of a subject onto the imaging device 1004. The aperture 1003 changes the amount of light that has passed through the lens 1002. The imaging device 1004 includes a solid state imaging device of each of the embodiments described above and converts an optical image captured by the lens 1002 into image data. The signal processing device 1007 performs various correction or data compression on image data output from the imaging device 1004. The timing generation unit 1008 outputs various timing signals to the imaging device 1004 and the signal processing device 1007. The general control/operation unit 1009 controls the entire digital still camera, and the memory unit 1010 temporarily stores image data. The storage medium control I/F unit 1011 is an interface used for storage or readout of image data on the storage medium 1012, and the storage medium 1012 is a removable storage medium such as a semiconductor memory used for storage or readout of imaging data. The external I/F unit 1013 is an interface used for communicating with an external computer or the like. A timing signal or the like may be input from the outside of the imaging system, and the imaging system may be any imaging system having at least the imaging device 1004 and the signal processing device 1007 that processes an image signal output from the imaging device 1004.

In the present embodiment, the configuration in which the imaging device 1004 and the AD conversion unit are provided on the same semiconductor substrate has been described. However, the imaging device 1004 and the AD conversion unit may be formed on the separate semiconductor substrates. Further, the imaging device 1004 and the signal processing device 1007 may be formed on the same semiconductor substrate.

Further, each pixel may include a first photoelectric conversion unit and a second photoelectric conversion unit. The signal processing device 1007 may be configured to process a pixel signal based on charges generated by the first photoelectric conversion unit and a pixel signal based on charges generated by the second photoelectric conversion unit and acquire distance information on the distance from the imaging device 1004 to a subject.

Sixth Embodiment

Figure 17A:
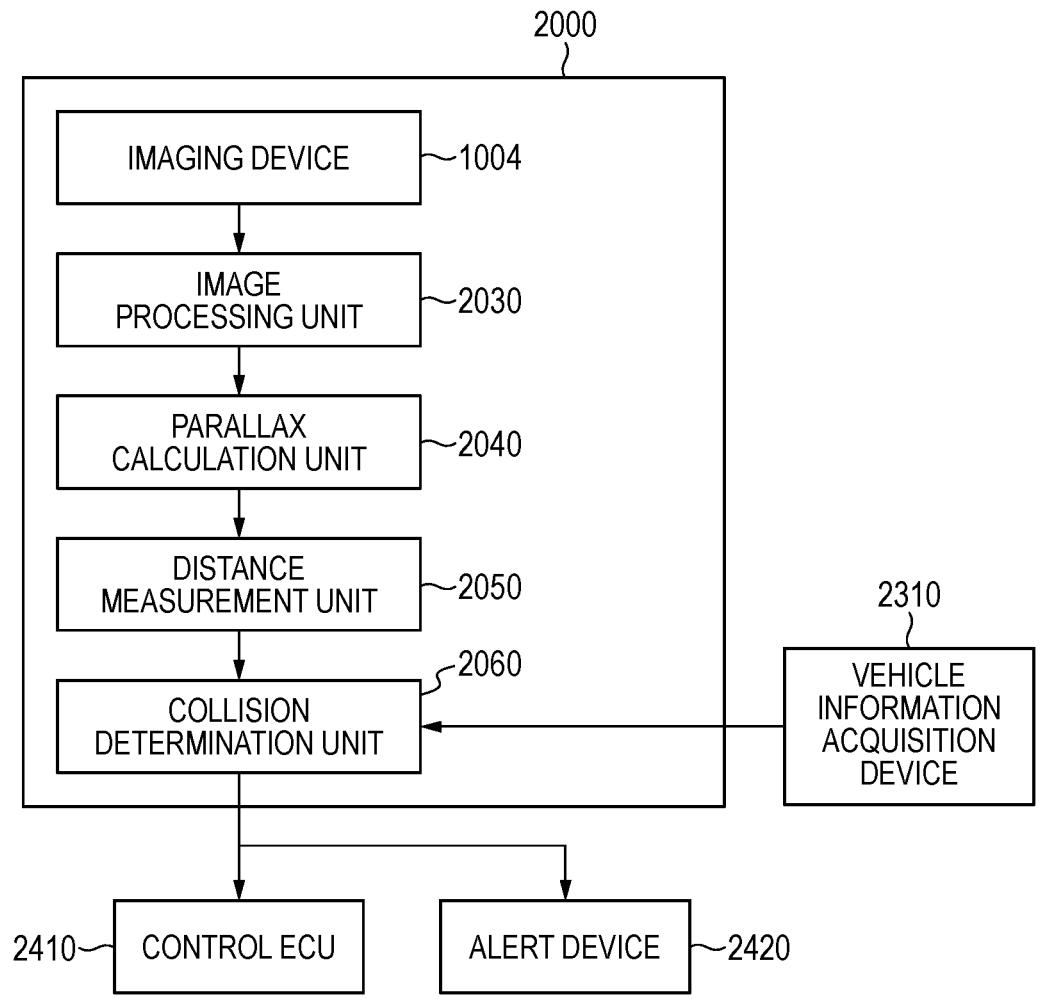
FIG. 17A is a block diagram of an imaging system related to an on-vehicle camera in an imaging system in a sixth embodiment.
Figure 17B:
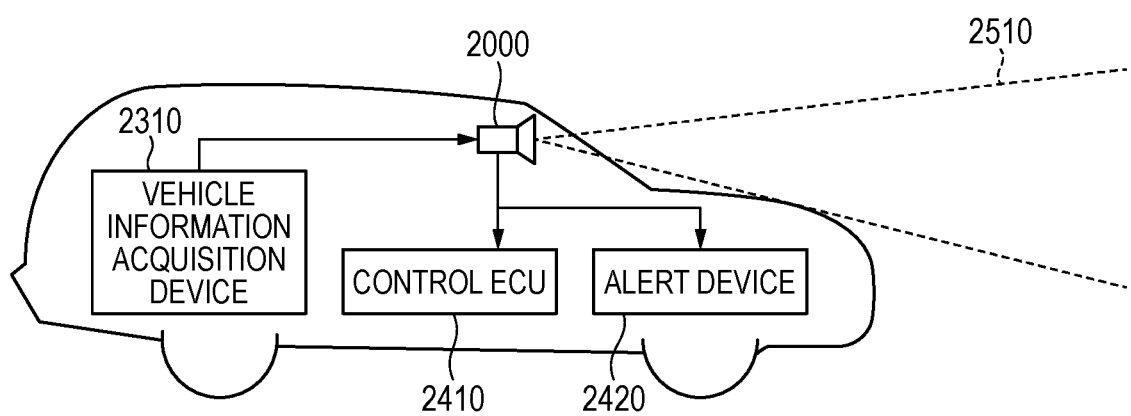
FIG. 17B is a block diagram of an imaging system related to the on-vehicle camera in the imaging system in the sixth embodiment.

FIG. 17A and FIG. 17B illustrates one example of an imaging system related to an on-vehicle camera in a sixth embodiment of the present invention. An imaging system 2000 has an imaging device 1004 of any of the embodiments described above. The imaging system 2000 has an image processing unit 2030 that performs image processing on a plurality of image data acquired by the imaging device 1004 and a parallax calculation unit 2040 that calculates a parallax (a phase difference of parallax images) from the plurality of image data acquired by the imaging system 2000. Further, the imaging system 2000 has a distance measurement unit 2050 that calculates a distance to the object based on the calculated parallax and a collision determination unit 2060 that determines whether or not there is a collision possibility based on the calculated distance. Here, the parallax calculation unit 2040 and the distance measurement unit 2050 are an example of a distance information acquisition unit that acquires distance information on the distance to the object. That is, the distance information is information on a parallax, a defocus amount, a distance to an object, or the like. The collision determination unit 2060 may use any of the distance information to determine the collision possibility. The distance information acquisition unit may be implemented by dedicatedly designed hardware or may be implemented by a software module. Further, the distance information acquisition device may be implemented by a field programmable gate array (FPGA) or an application specific integrated circuit (ASIC) or may be implemented by a combination thereof.

The imaging system 2000 is connected to the vehicle information acquisition device 2310 and can acquire vehicle information such as a vehicle speed, a yaw rate, a steering angle, or the like. Further, the imaging system 2000 is connected to a control ECU 2410, which is a control device that outputs a control signal for causing a vehicle to generate braking force based on a determination result by the collision determination unit 2060. Further, the imaging system 2000 is also connected to an alert device 2420 that issues an alert to the driver based on a determination result by the collision determination unit 2060. For example, when the collision probability is high as the determination result of the collision determination unit 2060, the control ECU 2410 performs vehicle control to avoid a collision or reduce damage by applying a brake, pushing back an accelerator, suppressing engine power, or the like. The alert device 2420 alerts a user by sounding an alert such as a sound, displaying alert information on a display of a car navigation system or the like, providing vibration to a seat belt or a steering wheel, or the like. The imaging system 2000 functions as a control unit that controls the operation of controlling a vehicle as described above.

In the present embodiment, an area around a vehicle, for example, a front area or a rear area is captured by using the imaging system 2000. FIG. 17B illustrates the imaging system when a front area of a vehicle (a capturing area 2510) is captured. The vehicle information acquisition device 2310 as an imaging control unit instructs the imaging system 2000 or the imaging device 1004 to perform the operation described in the above first to fifth embodiments. Since the operation of the imaging device 1004 is the same as that in the first to fourth embodiments, the description thereof will be omitted here. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as an automobile and can be applied to a moving unit (moving apparatus) such as a ship, an airplane, or an industrial robot, for example. In addition, the imaging system can be widely applied to a device which utilizes object recognition, such as an intelligent transportation system (ITS), without being limited to moving units.

Other Embodiments

The present invention is not limited to the embodiments described above, and various modifications are possible. For example, an example in which a part of the configuration of any of the embodiments is added to another embodiment or an example in which a part of the configuration of any of the embodiments is replaced with a part of the configuration of another embodiment is also one of the embodiments of the present invention.

Note that all the embodiments described above are mere embodied examples in implementing the present invention, and the technical scope of the present invention should not be construed in a limiting sense by these embodiments. That is, the present invention can be implemented in various forms without departing from the technical concept or the primary feature thereof.

The present invention is not limited to the embodiments described above, and various changes and modifications are possible without departing from the spirit and the scope of the present invention. Therefore, the following claims are attached in order to make the scope of the present invention public.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus comprising:
a plurality of pixels each including a photoelectric conversion unit that accumulates charges in accordance with incident light from a subject;
a drive unit that drives the pixels so that the photoelectric conversion unit performs accumulation of charges in each of a first exposure with a first exposure period and a second exposure with a second exposure period that is longer than the first exposure period;
a detection unit that performs detection of blinking of the subject; and
a control unit,
wherein the control unit performs the first exposure in a first cycle and performs the second exposure in a second cycle when a result of the detection indicates that the subject is not blinking,
wherein the control unit performs the first exposure in a cycle that is different from the first cycle when the result of the detection indicates that the subject is blinking,
wherein each of the pixels includes a first holding portion and a second holding portion that hold charges transferred from the photoelectric conversion unit, and
wherein the first holding portion holds charges accumulated in the first exposure period, and the second holding portion holds charges accumulated in the second exposure period.

2. The imaging apparatus according to claim 1, wherein the detection unit corrects a gain of a pixel signal based on charges accumulated in one of the first exposure period and the second accumulation period, on a ratio of the first exposure period and the second exposure period and detects the blinking resulted from the correction.

3. An imaging system comprising:
the imaging apparatus according to claim 1; and
a signal processing device that processes image signals output from the imaging apparatus.

4. The imaging system according to claim 3,
wherein each of the pixels includes a plurality of photoelectric conversion units, and
wherein the signal processing device processes the image signals generated by the plurality of photoelectric conversion units, respectively, and acquires distance information on a distance from the imaging apparatus to the subject.

5. An imaging apparatus comprising:
a plurality of pixels each including a photoelectric conversion unit that accumulates charges in accordance with incident light from a subject;
a drive unit that drives the pixels so that the photoelectric conversion unit performs accumulation of charges in each of a first exposure period and a second exposure period that is longer than the first exposure period;
a detection unit that performs detection of blinking of the subject in accordance with a first pixel signal based on charges accumulated in the first exposure period and a second pixel signal based on charges accumulated in the second exposure period; and a control unit that changes a start timing of either the first exposure period or the second exposure period when the detection unit detects blinking of the subject,
wherein each of the pixels includes a first holding portion and a second holding portion that hold charges transferred from the photoelectric conversion unit, and
wherein the first holding portion holds charges accumulated in the first exposure period, and the second holding portion holds charges accumulated in the second exposure period.

6. The imaging apparatus according to claim 5, wherein the control unit changes the start timing when the detection unit detects the blinking in consecutive multiple frames each including the first exposure period and the second exposure period.

7. The imaging apparatus according to claim 6, wherein the control unit changes the start timing by changing a length of each of the frames.

8. The imaging apparatus according to claim 5,
wherein one frame includes the first exposure period and the second exposure period, and
wherein the control unit changes the start timing without changing a length of the frame.

9. The imaging apparatus according to claim 8, wherein the control unit changes the start timing of the second exposure period by dividing the first exposure period into a plurality of first exposure periods and setting the second exposure period between the plurality of divided first exposure periods.

10. The imaging apparatus according to claim 8, wherein the control unit divides the first exposure period and the second exposure period into a plurality of first exposure periods and a plurality of second exposure periods, respectively, in advance in the frame and changes the start timing of at least some of the plurality of first exposure periods and the plurality of second exposure periods when the detection unit detects the blinking.

11. The imaging apparatus according to claim 5, wherein the control unit determines a shift amount of the start timing based on a motion amount of the subject in the first pixel signal and the second pixel signal.

12. The imaging apparatus according to claim 5, wherein the control unit delays the start timing when the detection unit detects the blinking.

13. The imaging apparatus according to claim 5, wherein the detection unit corrects a gain of one of the first pixel signal and the second pixel signal based on a ratio of the first exposure period and the second exposure period and detects the blinking based on the first pixel signal and the second pixel signal resulted from the correction.

14. The imaging apparatus according to claim 5 further comprising an image composition unit that composes an image in which the first pixel signal is replaced with the second pixel signal when the first pixel signal reaches a saturation level.

15. A drive method of an imaging apparatus including a plurality of pixels each including a photoelectric conversion unit that accumulates charges in accordance with incident light from a subject, the drive method comprising:
driving the pixels so that the photoelectric conversion unit alternately performs accumulation of charges in a first exposure period and accumulation of charges in a second exposure period having a different length from the first exposure period; and
changing a start timing of either the first exposure period or the second exposure period in accordance with comparison between a first pixel signal based on charges accumulated in the first exposure period and a second pixel signal based on charges accumulated in the second exposure period, wherein each of the pixels includes a first holding portion and a second holding portion that hold charges transferred from the photoelectric conversion unit, and wherein the first holding portion holds charges accumulated in the first exposure period, and the second holding portion holds charges accumulated in the second exposure period.

* * * * *